(12) United States Patent
Moniruzzaman

(10) Patent No.: US 9,994,710 B2
(45) Date of Patent: Jun. 12, 2018

(54) FIBER REINFORCED POLYETHERIMIDE COMPOSITIONS

(71) Applicant: SABIC Global Technologies B.V., Bergen op Zoom (NL)

(72) Inventor: Mohammad Moniruzzaman, Exton, PA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days. days.

(21) Appl. No.: 15/304,765

(22) PCT Filed: Apr. 28, 2015

(86) PCT No.: PCT/US2015/027981
§ 371 (c)(1),
(2) Date: Oct. 17, 2016

(87) PCT Pub. No.: WO2015/168116
PCT Pub. Date: Nov. 5, 2015

(65) Prior Publication Data
US 2017/0037246 A1 Feb. 9, 2017

Related U.S. Application Data

(60) Provisional application No. 61/986,323, filed on Apr. 30, 2014.

(51) Int. Cl.
| | | |
|---|---|---|
| *C08L 69/00* | (2006.01) | |
| *C08L 79/08* | (2006.01) | |
| *C08G 73/10* | (2006.01) | |

(52) U.S. Cl.
CPC .......... *C08L 79/08* (2013.01); *C08G 73/1053* (2013.01); *C08G 73/1071* (2013.01); *C08L 69/005* (2013.01); *C08L 2201/02* (2013.01); *C08L 2201/08* (2013.01)

(58) Field of Classification Search
None
See application file for complete search history.

(56) References Cited

U.S. PATENT DOCUMENTS

| | | |
|---|---|---|
| 2007/0066739 A1 | 3/2007 | Odle et al. |
| 2007/0149629 A1 | 6/2007 | Donovan et al. |
| 2009/0197999 A1 | 8/2009 | Shen et al. |

FOREIGN PATENT DOCUMENTS

| | | |
|---|---|---|
| CN | 101309973 A | 11/2008 |
| CN | 101374908 A | 2/2009 |
| CN | 101981085 A | 2/2011 |
| KR | 10-2008-0050476 A1 | 6/2008 |
| WO | WO2009095825 A2 | 8/2009 |

*Primary Examiner* — Ana Lucrecia Woodward
(74) *Attorney, Agent, or Firm* — Baker Hostetler LLP

(57) ABSTRACT

Disclosed herein are compositions comprising a polyetherimide, a polyester carbonate, and a reinforcement agent; wherein the composition comprises the reinforcement agent in an amount ranging from 1 wt % to 70 wt % relative to the total weight of the composition; wherein the polyester carbonate comprises at least 40 mole % resorcinol based aryl ester linkages. Also, disclosed herein are articles comprising the compositions disclosed.

18 Claims, 2 Drawing Sheets

FIBER REINFORCED POLYETHERIMIDE COMPOSITIONS

CROSS-REFERENCE TO RELATED APPLICATIONS

This application is The National Stage of International Application No. PCT/US2015/027981, filed Apr. 28, 2015, which claims the benefit of U.S. Provisional Application No. 61/986,323, filed Apr 30, 2014, the disclosures of which are incorporated herein by reference in their entireties.

BACKGROUND

Carbon or glass fiber filled polyetherimide (PEI) compositions exhibit high glass transition temperatures, high heat resistance, good stiffness and strength, low warpage and excellent flame retardant properties. However, low melt flow rate and low notched Izod impact strength of fiber reinforced polyetherimide compositions limit their application. Blending with polycarbonate (PC) improves the melt flow rate and notched Izod impact of unfilled PEI resins, but with a reduction in the tensile and flexural strength of PEI. Thus, there remains a need for fiber reinforced PEI compositions that exhibit a combination of good flexural strength, tensile strength, Izod impact strength, melt flow rate and fiber-resin adhesion.

SUMMARY

It is to be understood that both the following general description and the following detailed description are exemplary and explanatory only and are not restrictive. In one embodiment, a composition comprises a polyetherimide (PEI), a polyester carbonate (ITR-PC), and a reinforcement agent; wherein the reinforcement agent in an amount ranging from 1 weight percent (wt %) to 70 wt % relative to the total weight of the composition; and wherein the polyester carbonate comprises at least 40 mole % resorcinol based aryl ester linkages.

Also disclosed are articles comprising the composition.

While embodiments of the present disclosure can be described and claimed in a particular statutory class, such as the system statutory class, this is for convenience only and one of skill in the art will understand that each embodiment of the present disclosure can be described and claimed in any statutory class. Unless otherwise expressly stated, it is in no way intended that any method or embodiment set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE FIGURES

The accompanying figures, which are incorporated in and constitute a part of this specification, illustrate several embodiments and together with the description serve to explain the principles of the disclosure.

Figure 1:
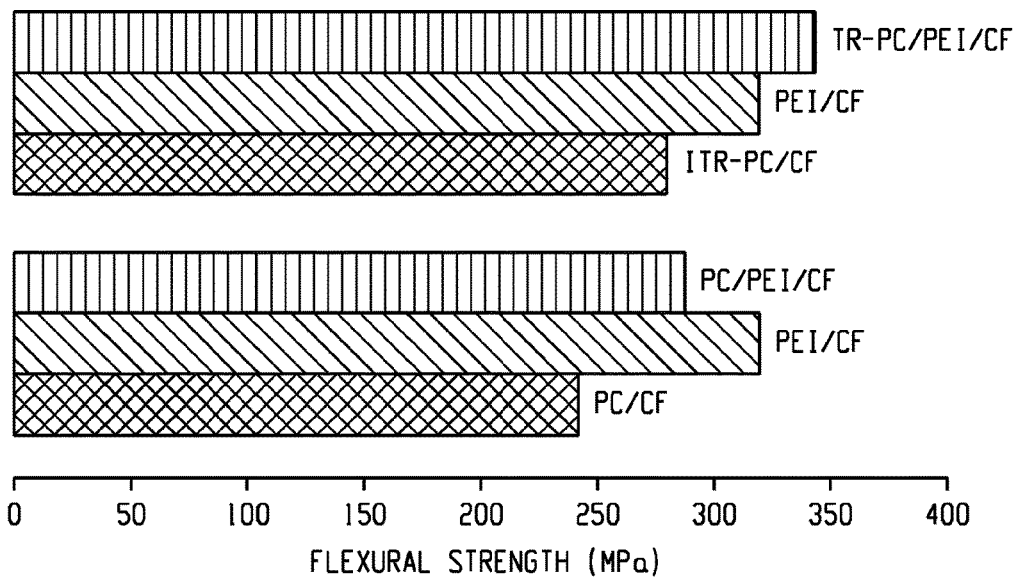
FIG. 1 shows the flexural strength of polycarbonate/carbon fiber (PC/CF), polyester carbonate/carbon fiber (ITR-PC/CF), polyetherimide/carbon fiber (PEI/CF), polyetherimide/polycarbonate/carbon fiber (PEI/PC/CF) and polyetherimide/polyester carbonate/carbon fiber (PEI/ITR-PC/CF) compositions.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DESCRIPTION

The present disclosure can be understood more readily by reference to the following detailed description of the disclosure and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular embodiments only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided herein can be different from the actual publication dates, which can require independent confirmation.

As used herein, nomenclature for compounds, including organic compounds, can be given using common names, International Union of Pure and Applied Chemistry (IUPAC), International Union of Biochemistry and Molecular Biology (IUBMB), or Chemical Abstract Society (CAS) recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further embodiment includes from the one particular value and/or to the other particular value. Similarly, when values are expressed as approximations, by use of the antecedent "about," it will be understood that the particular value forms a further embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight (pbw) of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %" or "weight %") of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, the term "derivative" refers to a compound having a structure derived from the structure of a parent compound (e.g., a compound disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein, the term "substituted" is contemplated to include all permissible substituents of organic compounds. In a broad embodiment, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain embodiments, unless expressly indicated to the contrary, individual substituents can be further optionally substituted (i.e., further substituted or unsubstituted).

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" or "aliphatic group," as used herein, denotes a hydrocarbon moiety that may be straight-chain (i.e., unbranched), branched, or cyclic (including fused, bridging, and spirofused polycyclic) and may be completely saturated or may contain one or more units of unsaturation, but which is not aromatic. Unless otherwise specified, aliphatic groups contain 1-20 carbon atoms. Aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dode cyl, tetradecyl, hexadecyl, eicosyl, tetracosyl, and the like. It is understand that the alkyl group is acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a $C_1$ alkyl, $C_1$-$C_2$ alkyl, $C_1$-$C_3$ alkyl, $C_1$-$C_4$ alkyl, $C_1$-$C_5$ alkyl, $C_1$-$C_6$ alkyl, $C_1$-$C_7$ alkyl, $C_1$-$C_8$ alkyl, $C_1$-$C_9$ alkyl, $C_1$-$C_{10}$ alkyl, $C_1$-$C_{12}$ alkyl and the like up to and including a $C_1$-$C_{24}$ alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The cycloalkyl group can be substituted or unsubstituted. The cycloalkyl group can be substituted with one or more groups including, but not limited to, alkyl, cycloalkyl, alkoxy, amino, ether, halide, hydroxy, nitro, silyl, sulfo-oxo, or thiol as described herein.

The terms "alkoxy" and "alkoxyl" as used herein to refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "aromatic group" as used herein refers to a ring structure having cyclic clouds of delocalized π electrons above and below the plane of the molecule, where the it clouds contain (4n+2) π electrons. A further discussion of aromaticity is found in Morrison and Boyd, Organic Chemistry, (5th Ed., 1987), Chapter 13, entitled "Aromaticity," pages 477-497, incorporated herein by reference. The term "aromatic group" is inclusive of both aryl and heteroaryl groups.

The term "aryl" as used herein is a group that contains any carbon-based aromatic group including, but not limited to, benzene, naphthalene, phenyl, biphenyl, anthracene, and the like. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, —$NH_2$, carboxylic acid, ester, ether, halide, hydroxy, ketone, azide, nitro, silyl, sulfo-oxo, or thiol as described herein. The term "biaryl" is a specific type of aryl group and is included in the definition of "aryl." In addition, the aryl group can be a single ring structure or comprise multiple ring structures that are either fused ring structures or attached via one or more bridging groups such as a carbon-carbon bond. For example, biaryl refers to two aryl groups that are bound together via a fused ring structure, as in naphthalene, or are attached via one or more carbon-carbon bonds, as in biphenyl.

The terms "amine" or "amino" as used herein are represented by the formula —$NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein. A specific example of amino is —$NH_2$.

The term "carboxylic acid" as used herein is represented by the formula —C(O)OH.

The term "ester" as used herein is represented by the formula —$OC(O)A^1$ or —$C(O)OA^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -$(A^1O(O)C$-$A^2$-$C(O)O)_a$— or -$(A^1O(O)C$-$A^2$-$OC(O))_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula -$(A^1O$-$A^2O)_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The terms "halo," "halogen," or "halide," as used herein can be used interchangeably and refer to F, Cl, Br, or I.

The terms "pseudohalide," "pseudohalogen" or "pseudohalo," as used herein can be used interchangeably and refer to functional groups that behave substantially similar to halides. Such functional groups include, by way of example, cyano, thiocyanato, azido, trifluoromethyl, trifluoromethoxy, perfluoroalkyl, and perfluoroalkoxy groups.

The term "heteroalkyl," as used herein refers to an alkyl group containing at least one heteroatom. Suitable heteroatoms include, but are not limited to, O, N, Si, P and S, wherein the nitrogen, phosphorous and sulfur atoms are optionally oxidized, and the nitrogen heteroatom is optionally quaternized. Heteroalkyls can be substituted as defined above for alkyl groups.

The term "heteroaryl," as used herein refers to an aromatic group that has at least one heteroatom incorporated within the ring of the aromatic group. Examples of heteroatoms include, but are not limited to, nitrogen, oxygen, sulfur, and phosphorus, where N-oxides, sulfur oxides, and dioxides are permissible heteroatom substitutions. The heteroaryl group can be substituted or unsubstituted, and the heteroaryl group can be monocyclic, bicyclic or multicyclic aromatic ring. The heteroaryl group can be substituted with one or more groups including, but not limited to, alkyl, cycloalkyl, alkoxy, amino, ether, halide, hydroxy, nitro, silyl, sulfo-oxo, or thiol as described herein. It is understood that a heteroaryl group may be bound either through a heteroatom in the ring, where chemically possible, or one of carbons comprising the heteroaryl ring.

A variety of heteroaryl groups are known in the art and include, without limitation, oxygen-containing rings, nitrogen-containing rings, sulfur-containing rings, mixed heteroatom-containing rings, fused heteroatom containing rings, and combinations thereof. Non-limiting examples of heteroaryl rings include furyl, pyrrolyl, pyrazolyl, imidazolyl, triazolyl, pyridinyl, pyridazinyl, pyrimidinyl, pyrazinyl, azepinyl, triazinyl, thienyl, oxazolyl, thiazolyl, oxadiazolyl, oxatriazolyl, oxepinyl, thiepinyl, diazepinyl, benzofuranyl, thionapthene, indolyl, benzazolyl, pyranopyrrolyl, isoindazolyl, indoxazinyl, benzoxazolyl, quinolinyl, isoquinolinyl, benzodiazonyl, naphthyridinyl, benzothienyl, pyridopyridinyl, acridinyl, carbazolyl and purinyl rings.

The term "hydroxyl" or "hydroxy" as used herein is represented by the formula —OH.

The term "ketone" as used herein is represented by the formula $A^1C(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "azide" or "azido" as used herein is represented by the formula —$N_3$.

The term "nitro" as used herein is represented by the formula —$NO_2$.

The term "nitrile" or "cyano" as used herein is represented by the formula —CN.

The term "sulfo-oxo" as used herein is represented by the formulas —$S(O)A^1$, —$S(O)_2A^1$, —$OS(O)_2A^1$, or —$OS(O)_2OA^1$, where $A^1$ can be hydrogen or an alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by the formula —$S(O)_2A^1$, where $A^1$ can be hydrogen or an alkyl, cycloalkyl, alkenyl, cycloalkenyl, alkynyl, cycloalkynyl, aryl, or heteroaryl group as described herein. The term "sulfone" as used herein is represented by the formula $A^1S(O)_2A^2$, where $A^1$ and $A^2$ can be, independently, an alkyl, cycloalkyl, alkenyl, cycloalkenyl, alkynyl, cycloalkynyl, aryl, or heteroaryl group as described herein. The term "sulfoxide" as used herein is represented by the formula $A^1S(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As described herein, compounds of the disclosure may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this disclosure are preferably those that result in the formation of stable or chemically feasible compounds. In is also contemplated that, in certain embodiments, unless expressly indicated to the contrary, individual substituents can be further optionally substituted (i.e., further substituted or unsubstituted).

The term "stable," as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R°$; —$(CH_2)_{0-4}OR°$; —$O(CH_2)_{0-4}R°$, —$O$—$(CH_2)_{0-4}C(O)OR°$; —$(CH_2)_{0-4}CH(OR°)_2$; —$(CH_2)_{0-4}SR°$; —$(CH_2)_{0-4}Ph$, which may be substituted with $R°$; —$(CH_2)_{0-4}O(CH_2)_{0-1}Ph$ which may be substituted with $R°$; —CH=CHPh, which may be substituted with $R°$; —$(CH_2)_{0-4}O(CH_2)_{0-1}$-pyridyl which may be substituted with $R°$; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)NR°_2$; —$N(R°)C(S)NR°_2$; —$(CH_2)_{0-4}N(R°)C(O)OR°$; —$N(R°)N(R°)C(O)R°$; —$N(R°)N(R°)C(O)NR°_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)SR°$; —$(CH_2)_{0-4}C(O)OSiR°_3$; —$(CH_2)_{0-4}OC(O)R°$; —$OC(O)(CH_2)_{0-4}SR$—, —$SC(S)SR°$; —$(CH_2)_{0-4}SC(O)R°$; —$(CH_2)_{0-4}C(O)NR°_2$; —$C(S)NR°_2$; —$C(S)SR°$; —$(CH_2)_{0-4}OC(O)NR°_2$; —$C(O)N(OR°)R°$; —$C(O)C(O)R°$; —$C(O)CH_2C(O)R°$; —$C(NOR°)R°$; —$(CH_2)_{0-4}SSR°$; —$(CH_2)_{0-4}S(O)_2R°$; —$(CH_2)_{0-4}S(O)_2OR°$; —$(CH_2)_{0-4}OS(O)_2R°$; —$S(O)_2NR°_2$; —$(CH_2)_{0-4}S(O)R°$; —$N(R°)S(O)_2NR°_2$; —$N(R°)S(O)_2R°$; —$N(OR°)R°$; —$C(NH)NR°_2$; —$P(O)_2R°$; —$P(O)R°_2$; —$OP(O)R°_2$; —$OP(O)(OR°)_2$; $SiR°_3$; —$(C_{1-4}$ straight or branched alkylene)O—N(R°)_2$; or —$(C_{1-4}$ straight or branched alkylene)C(O)O—N(R°)_2$, wherein each $R°$ may be substituted as defined below and is independently hydrogen, $C_{1-6}$ aliphatic, —$CH_2Ph$, —$O(CH_2)_{0-1}Ph$, —$CH_2$-(5-6 membered heteroaryl ring), or a 5 to 6-membered saturated, partially unsaturated, or aryl ring having 0 to 4 heteroatoms independently selected from nitrogen, oxygen, or sulfur, or, notwithstanding the definition above, two independent occurrences of $R°$, taken together with their intervening atom(s), form a 3 to 12-membered saturated, partially unsaturated, or aryl mono- or bicyclic ring having 0 to 4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —$(CH_2)_{0-2}R^\bullet$, -(haloR$^\bullet$), —$(CH_2)_{0-2}OH$, —$(CH_2)_{0-2}OR^\bullet$, —$(CH_2)_{0-2}CH(OR^\bullet)_2$; —$O(haloR^\bullet)$, —CN, —$N_3$, —$(CH_2)_{0-2}C(O)R^\bullet$, —$(CH_2)_{0-2}C(O)OH$, —$(CH_2)_{0-2}C(O)OR^\bullet$, —$(CH_2)_{0-2}SR^\bullet$, —$(CH_2)_{0-2}SH$, —$(CH_2)_{0-2}NH_2$, —$(CH_2)_{0-2}NHR^\bullet$, —$(CH_2)_{0-2}NR^\bullet_2$, —$NO_2$, —$SiR^\bullet_3$, —$OSiR^\bullet_3$, —$C(O)SR^\bullet$, —$(C_{1-4}$ straight or branched alkylene)$C(O)OR^\bullet$, or —$SSR^\bullet$ wherein each $R^\bullet$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5 to 6-membered saturated, partially unsaturated, or aryl ring having 0 to 4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =$NNR^*_2$, =NNHC(O)R*, =NNHC(O)OR*, =$NNHS(O)_2R^*$, =NR*, =NOR*, —$O(C(R^*_2))_{2-3}O$—, or —$S(C(R^*_2))_{2-3}S$—, wherein each independent occurrence of R* is selected from hydrogen, $C_{1-6}$ aliphatic which may be substituted as defined below, or an unsubstituted 5 to 6-membered saturated, partially unsaturated, or aryl ring having 0 to 4 heteroatoms independently selected from nitrogen, oxygen, or sulfur. Suitable divalent substituents that are bound to vicinal substitutable carbons of an "optionally substituted" group include: —$O(CR^*_2)_{2-3}O$—, wherein each independent occurrence of R* is selected from hydrogen, $C_{1-6}$ aliphatic which may be substituted as defined below, or an unsubstituted 5 to 6-membered saturated, partially unsaturated, or aryl ring having 0 to 4 heteroatoms independently selected from nitrogen, oxygen, or sulfur.

Suitable substituents on the aliphatic group of R* include halogen, —$R^\bullet$, -(haloR$^\bullet$), —OH, —$OR^\bullet$, —$O(haloR^\bullet)$, —CN, —C(O)OH, —$C(O)OR^\bullet$, —$NH_2$, —$NHR^\bullet$, —$NR^\bullet_2$, or —$NO_2$, wherein each $R^\bullet$ is unsubstituted or where preceded by "halo" is substituted only with one or more halogens, and is independently $C_{1-4}$ aliphatic, —$CH_2Ph$, —$O(CH_2)_{0-1}Ph$, or a 5 to 6-membered saturated, partially unsaturated, or aryl ring having 0 to 4 heteroatoms independently selected from nitrogen, oxygen, or sulfur.

Suitable substituents on a substitutable nitrogen of an "optionally substituted" group include —$R^\dagger$, —$NR^\dagger_2$, —$C(O)R^\dagger$, —$C(O)OR^\dagger$, —$C(O)C(O)R^\dagger$, —$C(O)CH_2C(O)R^\dagger$, —$S(O)_2R^\dagger$, —$S(O)_2NR^\dagger_2$, —$C(S)NR^\dagger_2$, —$C(NH)NR^\dagger_2$, or —$N(R^\dagger)S(O)_2R^\dagger$; wherein each $R^\dagger$ is independently hydrogen, $C_{1-6}$ aliphatic which may be substituted as defined below, unsubstituted —OPh, or an unsubstituted 5 to 6-membered saturated, partially unsaturated, or aryl ring having 0 to 4 heteroatoms independently selected from nitrogen, oxygen, or sulfur, or, notwithstanding the definition above, two independent occurrences of $R^\dagger$, taken together with their intervening atom(s) form an unsubstituted 3 to 12-membered saturated, partially unsaturated, or aryl mono- or bicyclic ring having 0 to 4 heteroatoms independently selected from nitrogen, oxygen, or sulfur.

Suitable substituents on the aliphatic group of $R^\dagger$ are independently halogen, —$R^\bullet$, -(haloR$^\bullet$), —OH, —$OR^\bullet$, —$O(haloR^\bullet)$, —CN, —C(O)OH, —$C(O)OR^\bullet$, —$NH_2$, —$NHR^\bullet$, —$NR^\bullet_2$, or —$NO_2$, wherein each $R^\bullet$ is unsubstituted or where preceded by "halo" is substituted only with one or more halogens, and is independently $C_{1-4}$ aliphatic, —$CH_2Ph$, —$O(CH_2)_{0-1}Ph$, or a 5 to 6-membered saturated, partially unsaturated, or aryl ring having 0 to 4 heteroatoms independently selected from nitrogen, oxygen, or sulfur.

The term "leaving group" refers to an atom (or a group of atoms) with electron withdrawing ability that can be displaced as a stable species, taking with it the bonding electrons. Examples of suitable leaving groups include halides and sulfonate esters, including, but not limited to, triflate, mesylate, tosylate, and brosylate.

Compounds described herein can contain one or more double bonds and, thus, potentially give rise to cis/trans (E/Z) isomers, as well as other conformational isomers. Unless stated to the contrary, the disclosure includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present disclosure includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Compounds described herein comprise atoms in both their natural isotopic abundance and in non-natural abundance. The disclosed compounds can be isotopically labeled or isotopically-substituted compounds identical to those described, but for the fact that one or more atoms are replaced by an atom having an atomic mass or mass number different from the atomic mass or mass number typically found in nature. Examples of isotopes that can be incorporated into compounds of the disclosure include isotopes of hydrogen, carbon, nitrogen, oxygen, phosphorous, fluorine and chlorine, such as $^2H$, $^3H$, $^3C$, $^{14}C$, $^{15}N$, $^{18}O$, $^{17}O$, $^{35}S$, $^{18}F$ and $^{36}Cl$, respectively. Compounds further comprise prodrugs thereof, and pharmaceutically acceptable salts of said compounds or of said prodrugs which contain the aforementioned isotopes and/or other isotopes of other atoms are within the scope of this disclosure. Certain isotopically labeled compounds of the present disclosure, for example those into which radioactive isotopes such as $^3H$ and $^{14}C$ are incorporated, are useful in drug and/or substrate tissue distribution assays. Tritiated, i.e., $^3H$, and carbon-14, i.e., $^{14}C$, isotopes are particularly preferred for their ease of preparation and detectability. Further, substitution with heavier isotopes such as deuterium, i.e., $^2H$, can afford certain therapeutic advantages resulting from greater metabolic stability, for example increased in vivo half-life or reduced dosage requirements and, hence, may be preferred in some circumstances. Isotopically labeled compounds of the present disclosure and prodrugs thereof can generally be prepared by carrying out the procedures below, by substituting a readily available isotopically labeled reagent for a non-isotopically labeled reagent.

The compounds described in the disclosure can be present as a solvate. In some cases, the solvent used to prepare the solvate is an aqueous solution, and the solvate is then often referred to as a hydrate. The compounds can be present as a hydrate, which can be obtained, for example, by crystallization from a solvent or from aqueous solution. In this connection, one, two, three or any arbitrary number of solvent or water molecules can combine with the compounds according to the disclosure to form solvates and hydrates. Unless stated to the contrary, the disclosure includes all such possible solvates.

It is also appreciated that certain compounds described herein can be present as an equilibrium of tautomers. For example, ketones with an α-hydrogen can exist in an equilibrium of the keto form and the enol form.

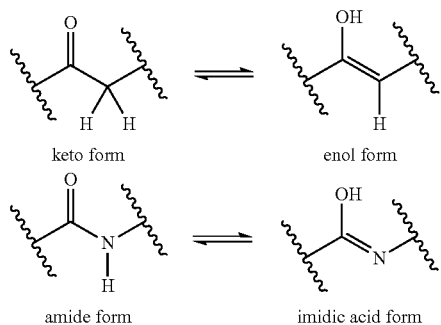

keto form    enol form amide form    imidic acid form

Likewise, amides with an N-hydrogen can exist in an equilibrium of the amide form and the imidic acid form. As another example, pyridinones can exist in two tautomeric forms, as shown below.

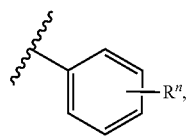

Unless stated to the contrary, the disclosure includes all such possible tautomers.

It is known that chemical substances form solids which are present in different states of order which are termed polymorphic forms or modifications. The different modifications of a polymorphic substance can differ greatly in their physical properties. The compounds according to the disclosure can be present in different polymorphic forms, with it being possible for particular modifications to be metastable. Unless stated to the contrary, the disclosure includes all such possible polymorphic forms.

In some embodiments, a structure of a compound can be represented by a formula:

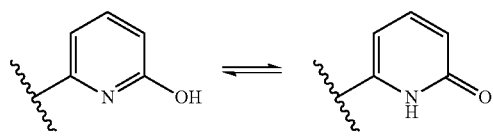 [SMILES: *c1cccc(O)n1 ; *c1cccc(=O)[nH]1]

which is understood to be equivalent to a formula:

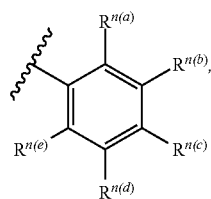

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

As used herein, substantially identical reference composition refers to a composition that is identical to the disclosed composition, except that the substantially identical reference composition has been prepared in the absence of one or more ingredients. For example, "the substantially identical reference composition in the absence of one or more of the polyetherimide, the polycarbonate, and the reinforcement agent" refers to a composition identical to the disclosed composition, except without one or more of the polyetherimide, the polycarbonate, and the reinforcement agent.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all embodiments of this application including, but not limited to, steps in methods of making and using the compositions of the disclosure. Thus, if there are a variety of additional steps that can be performed it is understood that each of these additional steps can be performed with any specific embodiment or combination of embodiments of the methods of the disclosure.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Disclosed herein is a composition comprising a polyetherimide (PEI), a resorcinol based polyester carbonate (ITR-PC), and a reinforcement agent wherein the composition comprises the reinforcement agent in an amount ranging from 1 wt % to 70 wt % relative to the total weight of the composition; and wherein the polyester carbonate comprises at least 40 mole % resorcinol based aryl ester linkages.

In one embodiment, the composition relates to a thermoplastic composition. In another embodiment, the composition comprises a continuous thermoplastic polymer phase and a dispersed phase. In a further embodiment, the dispersed phase comprises a reinforcement agent. In further embodiment, the continuous thermoplastic polymer phase comprises a polyetherimide and a polyester carbonate. In a yet further embodiment, the polyester carbonate comprises at least 40 mole % resorcinol based aryl ester linkages.

In one embodiment, the composition demonstrates improved properties. The improved properties include, for example, tensile strength, flexural strength, melt flow rate, notched izod impact strength, and fiber-resin adhesion. In another embodiment, the composition demonstrates one or more of the improved properties.

The composition can demonstrate improved tensile strength and improved flexural strength. Polycarbonates or polyester carbonates typically have lower tensile strength and flexural strength than PEI. As such, adding polycarbonate to a composition comprising PEI typically lowers the tensile strength and the flexural strength. A composition comprising a polyetherimide (PEI), a polyester carbonate (ITR-PC), and a carbon fiber (CF) demonstrates improved tensile strength compared to a substantially identical reference composition in the absence of one or more of the polyetherimide, the polycarbonate, and the reinforcement agent. A composition comprising a polyetherimide (PEI), a polyester carbonate (ITR-PC), and a carbon fiber demonstrates improved flexural strength compared to a substantially identical reference composition in the absence of one or more of the polyetherimide, the polycarbonate, and the reinforcement agent.

The composition can demonstrate tensile strength in an amount ranging from 120 megapascal (MPa) to 350 MPa, including exemplary values of 190 MPa, 200 MPa, 210 MPa, 220 MPa, 230 MPa, 240 MPa, 250 MPa, 260 MPa, 270 MPa, 280 MPa, and 290 MPa. In still further embodiments, the composition can demonstrate tensile strength in an amount within any range of amounts derived from any two of the above stated values. For example, the composition can demonstrate tensile strength in an amount ranging from 240 MPa to 280 MPa or from 200 MPa to 260 MPa.

In one embodiment, the composition demonstrates a higher tensile strength compared to a substantially identical reference composition in the absence of one or more of the polyetherimide, the polyester carbonate, and the reinforcement agent.

The composition can demonstrate a flexural strength in an amount ranging from 200 MPa to 425 MPa, including exemplary values of 260 MPa, 270 MPa, 280 MPa, 290 MPa, 300 MPa, 310 MPa, 320 MPa, 330 MPa, 340 MPa, 350 MPa, 360 MPa, 370 MPa, 380 MPa, 390 MPa, 400 MPa, 410 MPa, and 420 MPa. In still further embodiments, the composition can demonstrate flexural strength in an amount within any range of amounts derived from any two of the above stated values. For example, the composition can demonstrate a flexural strength in an amount ranging from 350 MPa to 400 MPa or 275 MPa to 350 MPa.

In one embodiment, the composition demonstrates a higher flexural strength compared to a substantially identical reference composition in the absence of one or more of the polyetherimide, the polyester carbonate, and the reinforcement agent.

The composition can demonstrate improved fiber-resin adhesion. In one embodiment, the composition demonstrates a stronger fiber-resin adhesion compared to a substantially identical reference composition in the absence of the polyester carbonate. Without wishing to be bound to the theory, the composition can demonstrate the improved fiber-resin adhesion due to the synergistic effect of PEI, ITR-PC and the filler.

The composition can demonstrate an improved melt volume rate. A composition comprising PEI and a reinforcing agent typically has a reduced melt volume rate compared to a substantially identical reference composition in the absence of the reinforcing agent. The reduction in flow can cause difficulties, for example, in part-filling during injection, in compression molding, or in filling the thin wall parts. In one embodiment, the composition can demonstrate a higher melt volume rate compared to a substantially identical reference composition in the absence of the polyester carbonate.

The composition can demonstrate an improved notched izod impact strength. In one embodiment, the composition demonstrates a higher notched izod impact strength compared to a substantially identical reference composition in the absence of the polyester carbonate.

In one embodiment, a composition comprising a polyetherimide, a polyester carbonate, and a reinforcement agent; wherein the composition comprises the polyetherimide in an amount ranging from 25 wt % to 60 wt % relative to the total weight of the composition; wherein the composition comprises the polyester carbonate in an amount ranging from 20 wt % to 50 wt % relative to the total weight of the composition, and the polyester carbonate comprises at least 40 mole % resorcinol based aryl ester linkages; and wherein the composition comprises the reinforcement agent in an amount ranging from 1 wt % to 70 wt % relative to the total weight of the composition.

As disclosed, the composition comprises polyetherimide (PEI). PEI includes PEI copolymers. The PEI can be selected from (i) PEI homopolymers, (ii) PEI co-polymers, e.g., polyetherimidesulfones or polyetherimide-siloxane copolymers, and (iii) combinations thereof. PEIs are known polymers and are sold by SABIC Innovative Plastics under the ULTEM, EXTEM™*, and Siltem* brands (Trademarks of SABIC Innovative Plastics IP B.V.).

PEI can have various desired properties such as high glass transition temperature, high heat resistance, good stiffness and strength, low warpage, and flame retardant properties.

In an embodiment, the PEI can be of formula (1):

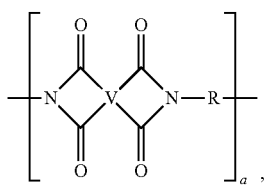

(1)

wherein a is more than 1, for example 10 to 1,000 or more, or more specifically 10 to 500. In one example, n can be 10-100, 10-75, 10-50 or 10-25.

The group V in formula (1) is a tetravalent linker containing an ether group (a "PEI" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

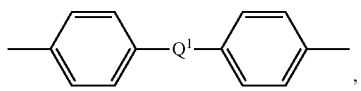

(2)

wherein Q1 includes but is not limited to a divalent moiety such as —O—, —S—, —C(O)—, —SO2-, —SO—, —CyH2y- (y being an integer from 1 to 5), and halogenated derivatives thereof, including perfluoroalkylene groups.

In an embodiment, linkers V include but are not limited to tetravalent aromatic groups of formula (3):

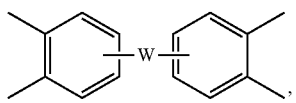

(3)

wherein W is a divalent moiety including —O—, —SO2-, or a group of the formula —O—Z—O— wherein the divalent bonds of the —O— or the —O—Z—O— group are in the 3,3', 3,4', 4,3', or the 4,4' positions, and wherein Z includes, but is not limited to, divalent groups of formulas (4):

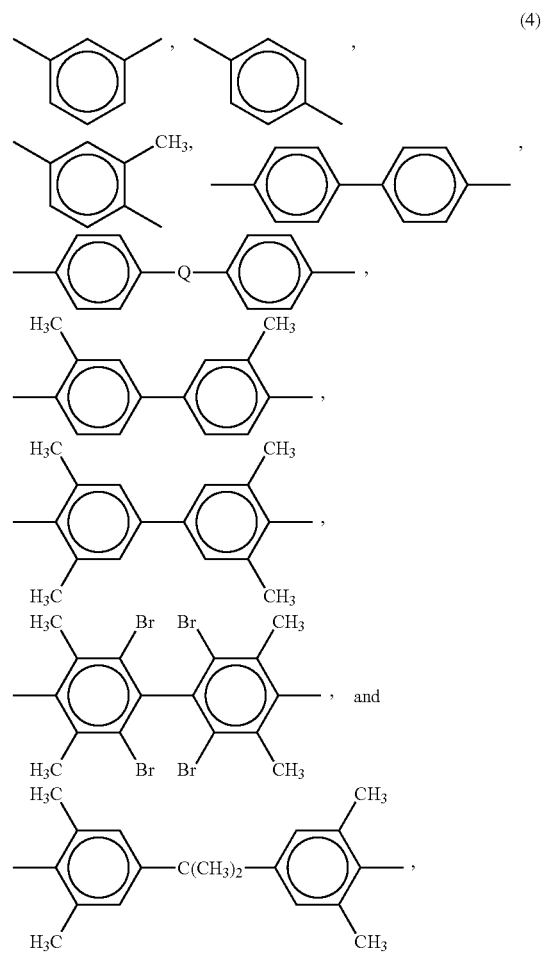

(4)

wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In an embodiment, the PEI comprise more than 1, specifically 10 to 1,000, or more specifically, 10 to 500 structural units, of formula (5):

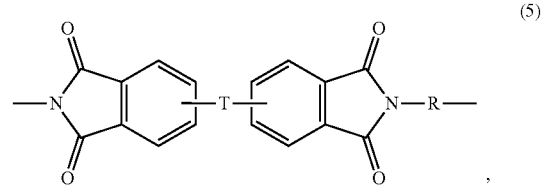

(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another embodiment, the polyetherimidesulfones are PEIs comprising ether groups and sulfone groups wherein at least 50 mole % of the linkers V and the groups R in formula (1) comprise a divalent arylenesulfone group. For example, all linkers V, but no groups R, can contain an arylenesulfone group; or all groups R but no linkers V can contain an arylenesulfone group; or an arylenesulfone can be present in some fraction of the linkers V and R groups, provided that the total mole fraction of V and R groups containing an aryl sulfone group is greater than or equal to 50 mole %.

Even more specifically, polyetherimidesulfones can comprise more than 1, specifically 10 to 1,000, or more specifically, 10 to 500 structural units of formula (6):

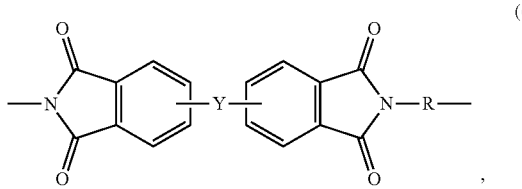

wherein Y is —O—, —SO2-, or a group of the formula —O—Z—O— wherein the divalent bonds of the —O—, SO2-, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO2- groups.

It is to be understood that the PEI, polyetherimidesiloxane copolymer, and polyetherimidesulfone can optionally comprise linkers V that do not contain ether or ether and sulfone groups, for example linkers of formula (7):

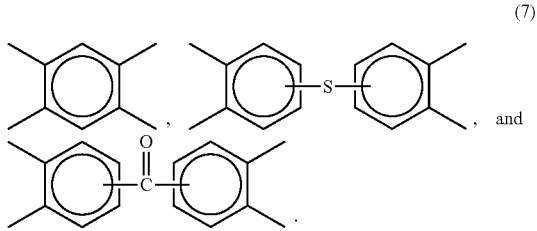

Imide units containing such linkers are generally be present in amounts ranging from 0 to 10 mole % of the total number of units, specifically 0 to 5 mole %. In one embodiment no additional linkers V are present in the PEIs and polyetherimidesulfones.

In another embodiment, the PEI comprises 10 to 500 structural units of formula (5) and the polyetherimidesulfone contains 10 to 500 structural units of formula (6).

PEIs, polyetherimide-siloxane copolymer, and polyetherimidesulfones can be prepared by any suitable process. In one embodiment, PEI and PEI copolymers include polycondensation polymerization processes and halo-displacement polymerization processes.

Polycondensation methods can include a method for the preparation of PEI having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO2 in what is known as the nitro-displacement step. After purification, the BPA-bisimide is reacted with phthalic anhydride in an imide exchange reaction to afford BPA-dianhydride, which in turn is reacted with a diamine such as meta-phenylene diamine (MPD) in ortho-dichlorobenzene in an imidization-polymerization step to afford the product PEI.

Other diamines are also possible. Examples of suitable diamines include: m-phenylenediamine; p-phenylenediamine; 2,4-diaminotoluene; 2,6-diaminotoluene; m-xylylenediamine; p-xylylenediamine; benzidine; 3,3'-dimethylbenzidine; 3,3'-dimethoxybenzidine; 1,5-diaminonaphthalene; bis(4-aminophenyl)methane; bis(4-aminophenyl)propane; bis(4-aminophenyl) sulfide; bis(4-aminophenyl)sulfone; bis(4-aminophenyl)ether; 4,4'-diaminodiphenylpropane; 4,4'-diaminodiphenylmethane(4,4'-methylenedianiline); 4,4'-diaminodiphenylsulfide; 4,4'-diaminodiphenylsulfone; 4,4'-diaminodiphenylether(4,4'-oxydianiline); 1,5-diaminonaphthalene; 3,3'dimethylbenzidine; 3-methylheptamethylenediamine; 4,4-dimethylheptamethylenediamine; 2,2',3,3'-tetrahydro-3,3,3',3'-tetramethyl-1,1'-spirobi[1H-indene]-6,6'-diamine; 3,3',4,4'-tetrahydro-4,4,4',4'-tetramethyl-2,2'-spirobi[2H-1-benzo-pyran]-7,7'-diamine; 1,1'-bis[1-amino-2-methyl-4-phenyl]cyclohexane, and isomers thereof as well as mixtures and blends comprising at least one of the foregoing. In one embodiment, the diamines are specifically aromatic diamines, especially m- and p-phenylenediamine and mixtures comprising at least one of the foregoing.

Suitable dianhydrides that can be used with the diamines include and are not limited to 2,2-bis[4-(3,4-dicarboxyphenoxy)phenyl]propane dianhydride; 4,4'-bis(3,4-dicarboxyphenoxy)diphenylether dianhydride; 4,4'-bis(3,4-dicarboxyphenoxy)diphenylsulfide dianhydride; 4,4'-bis(3,4-dicarboxyphenoxy)benzophenone dianhydride; 4,4'-bis(3,4-dicarboxyphenoxy)diphenylsulfone dianhydride; 2,2-bis[4-(2,3-dicarboxyphenoxy)phenyl]propane dianhydride; 4,4'-bis(2,3-dicarboxyphenoxy)diphenylether dianhydride; 4,4'-bis(2,3-dicarboxyphenoxy)diphenylsulfide dianhydride; 4,4'-bis(2,3-dicarboxyphenoxy)benzophenone dianhydride; 4,4'-bis(2,3-dicarboxyphenoxy)diphenylsulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenylether dianhydride; 4-(2,3-dicarboxyphenoxy)-4'-(3,4-dicarboxyphenoxy)diphenylsulfide dianhydride; 4-(2,3-dicarboxyphenoxy)-4'-(3,4-dicarboxyphenoxy)benzophenonedianhydride; 4-(2,3-dicarboxyphenoxy)-4'-(3,4-dicarboxyphenoxy)diphenylsulfone dianhydride; 1,3-bis(2,3-dicarboxyphenoxy)benzene dianhydride; 1,4-bis(2,3-dicarboxyphenoxy)benzene dianhydride; 1,3-bis(3,4-dicarboxyphenoxy)benzene dianhydride; 1,4-bis(3,4-dicarboxyphenoxy)benzene dianhydride; 3,3',4,4'-diphenyl tetracarboxylicdianhydride; 3,3',4,4'-benzophenonetetracarboxylic dianhydride; naphthalic dianhydrides, such as 2,3,6,7-naphthalic dianhydride, etc.; 3,3',4,4'-biphenylsulphonictetracarboxylic dianhydride; 3,3',4,4'-biphenylethertetracarboxylic dianhydride; 3,3',4,4'-dimethyldiphenylsilanetetracarboxylic dianhydride; 4,4'-bis (3,4-dicarboxyphenoxy)diphenylsulfidedianhydride; 4,4'-bis (3,4-dicarboxyphenoxy)diphenylsulphone dianhydride; 4,4'-bis (3,4-dicarboxyphenoxy)diphenylpropane dianhydride; 3,3',4,4'-biphenyltetracarboxylic dianhydride; bis (phthalic)phenylsulphineoxide dianhydride; p-phenylene-bis(triphenylphthalic)dianhydride; m-phenylene-bis(triphenylphthalic)dianhydride; bis(triphenylphthalic)-4,4'-diphenylether dianhydride; bis(triphenylphthalic)-4,4'-diphenylmethane dianhydride; 2,2'-bis(3,4-dicarboxyphenyl)hexafluoropropane dianhydride; 4,4'-oxydiphthalic dianhydride; pyromellitic dianhydride; 3,3',4,4'-diphenylsulfonetetracarboxylic dianhydride; 4',4'-bisphenol A dianhydride; hydroquinone diphthalic dianhydride; 6,6'-bis(3,4-dicarboxyphenoxy)-2,2',3,3'-tetrahydro-3,3,3',3'-tetramethyl-1,1'-spirobi[1H-indene]dianhydride; 7,7'-bis(3,4-dicarboxyphenoxy)-3,3',4,4'-tetrahydro-4,4,4',4'-tetramethyl-2,2'-spirobi[2H-1-benzopyran] dianhydride; 1,1'-bis[1-(3,4-dicarboxyphenoxy)-2-methyl-4-phenyl]cyclohexane dianhydride; 3,3',4,4'-diphenylsulfonetetracarboxylic dianhydride; 3,3',4,4'-diphenylsulfidetetracarboxylic dianhydride; 3,3',4,4'-diphenylsulfoxidetetracarboxylic dianhydride; 4,4'-oxydiphthalic dianhydride; 3,4'-oxydiphthalic dianhydride; 3,3'-oxydiphthalic dianhydride; 3,3'-benzophenonetetracarboxylic dianhydride; 4,4'-carbonyldiphthalic dianhydride; 3,3',4,4'-diphenylmethanetetracarboxylic dianhydride; 2,2-bis(4-(3,3-dicarboxyphenyl)propane dianhydride; 2,2-bis(4-(3,3-dicarboxyphenyl)hexafluoropropane dianhydride; (3,3',4,4'-diphenyl)phenylphosphinetetracarboxylic dianhydride; (3,3',4,4'-diphenyl)phenylphosphineoxidetetracarboxylic dianhydride; 2,2'-dichloro-3,3',4,4'-biphenyltetracarboxylic dianhydride; 2,2'-dimethyl-3,3',4,4'-biphenyltetracarboxylic dianhydride; 2,2'-dicyano-3,3',4,4'-biphenyltetracarboxylic dianhydride; 2,2'-dibromo-3,3',4,4'-biphenyltetracarboxylic dianhydride; 2,2'-diiodo-3,3',4,4'-biphenyltetracarboxylic dianhydride; 2,2'-ditrifluoromethyl-3,3',4,4'-biphenyltetracarboxylic dianhydride; 2,2'-bis(1-methyl-4-phenyl)-3,3',4,4'-biphenyltetracarboxylic dianhydride; 2,2'-bis(1-trifluoromethyl-2-phenyl)-3,3',4,4'-biphenyltetracarboxylic dianhydride; 2,2'-bis(1-trifluoromethyl-3-phenyl)-3,3',4,4'-biphenyltetracarboxylic dianhydride; 2,2'-bis(1-trifluoromethyl-4-phenyl)-3,3',4,4'-biphenyltetracarboxylic dianhydride; 2,2'-bis(1-phenyl-4-phenyl)-3,3',4,4'-biphenyltetracarboxylic dianhydride; 4,4'-bisphenol A dianhydride; 3,4'-bisphenol A dianhydride; 3,3'-bisphenol A dianhydride; 3,3',4,4'-diphenylsulfoxidetetracarboxylic dianhydride; 4,4'-carbonyldiphthalic dianhydride; 3,3',4,4'-diphenylmethanetetracarboxylic dianhydride; 2,2'-bis(1,3-trifluoromethyl-4-phenyl)-3,3',4,4'-biphenyltetracarboxylic dianhydride, and all isomers thereof, as well as combinations of the foregoing.

Halo-displacement polymerization methods for making PEIs and polyetherimidesulfones include and are not limited to, the reaction of a bis(phthalimide) for formula (8):

(8)

wherein R is as described above and X is a nitro group or a halogen. Bis-phthalimides (8) can be formed, for example, by the condensation of the corresponding anhydride of formula (9):

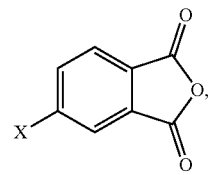

(9)

wherein X is a nitro group or halogen, with an organic diamine of the formula (10):

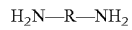

$H_2N-R-NH_2$ (10), wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3, 5-diethylphenyl) methane, bis (4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) ether and 1,3-bis(3-aminopropyl) tetramethyldisiloxane. Mixtures of these amines can be used. Illustrative examples of amine compounds of formula (10) containing sulfone groups include but are not limited to, diaminodiphenylsulfone and bis(aminophenoxy phenyl) sulfones. Combinations comprising any of the foregoing amines can be used.

In certain embodiments, the PEI can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482, which is incorporated herein by reference in its entirety. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the PEI comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a BPA group). Further, the polyetherimidesulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The PEI, polyetherimide-siloxane copolymer, and polyetherimidesulfone can be used alone or in combination with each other and/or other of the disclosed polymeric materials in fabricating the polymeric components of the disclosure. In one embodiment, only the PEI is used. In another embodiment, the weight ratio of PEI to polyetherimide-siloxane copolymer can be from 99:1 to 50:50.

The PEIs can have a weight average molecular weight (Mw) of 5,000 to 100,000 grams per mole (g/mole) as measured by gel permeation chromatography. In some embodiments the Mw can be 10,000 to 80,000 g/mole. Mw, as used herein, refers to the absolute Mw.

The PEIs can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The PEIs can have a glass transition temperature of greater than 180 degrees Celsius (° C.), specifically of 200° C. to 500° C., as measured using differential scanning calorimetry per ASTM test D3418. In some embodiments, the PEI and, in particular, a PEI has a glass transition temperature of 240° C. to 350° C.

The PEI can have a melt index of 0.1 to 10 grams per minute (g/min), as measured by ASTM D1238 at 340° C. to 370° C., using a 6.7 kilogram (kg) weight.

natively, mixtures of 3-chloro- and 4-chlorophthalic anhydride may be employed to provide a mixture of isomeric bischlorophthalimides which may be polymerized by chloro-displacement with BPA disodium salt as described above.

The PEI resin can have a Mw within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 Daltons. For example, the PEI resin can have a Mw from 5,000 to 100,000 Daltons, from 5,000 to 80,000 Daltons, or from 5,000 to 70,000 Daltons. The primary alkyl amine modified PEI will have a lower Mw and a higher melt flow than the starting, unmodified, PEI.

In a further embodiment, the PEI has a structure represented by a formula (12):

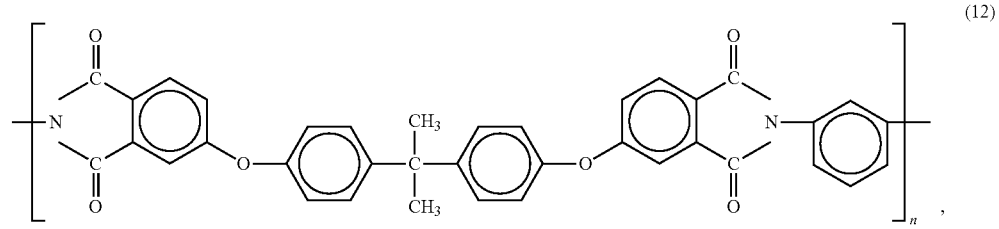

An alternative halo-displacement polymerization process for making PEIs, e.g., PEIs having structure (1), is a process referred to as the chloro-displacement process (X is Cl in formula (8)). The chloro-displacement process is described as follows: 4-chlorophthalic anhydride and MPD are reacted in the presence of a catalytic amount of sodium phenyl phosphinate catalyst to produce the bischlorophthalimide of MPD (CAS No. 148935-94-8). The bischlorophthalimide is then subjected to polymerization by chloro-displacement reaction with the disodium salt of BPA in the presence of a catalyst in ortho-dichlorobenzene or anisole solvent. Alterwherein the PEI polymer has a Mw of at least 20,000 Daltons, 30,000 Daltons, 40,000 Daltons, 50,000 Daltons, 60,000 Daltons, 80,000 Daltons, or 100,000 Daltons.

In one embodiment, the PEI has a structure represented by a formula (13):

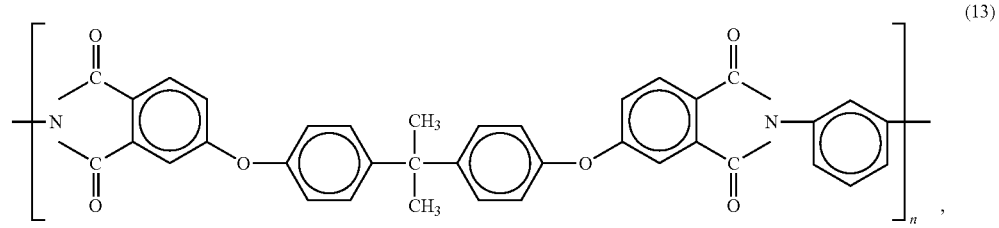

wherein n is greater than 1, for example greater than 10. In one embodiment n is between 2-100, 2-75, 2-50, or 2-25, for example 10-100, 10-75, 10-50, or 10-25. In another example, n can be 38, 56, or 65.

In certain embodiments, the PEI resin can be selected from the group consisting of a PEI, for example, as described in U.S. Pat. Nos. 3,875,116; 6,919,422; and 6,355,723; a silicone PEI, for example as described in U.S. Pat. Nos. 4,690,997 and 4,808,686 and a polyetherimidesulfone resin, as described in U.S. Pat. No. 7,041,773 and combinations thereof.

The PEI resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300, and 310 degrees Celsius (° C.). For example, the PEI resin can have a glass transition temperature greater than about 200° C.

The PEI resin can be substantially free (less than 100 ppm) of benzylic protons. The PEI resin can be free of benzylic protons. The PEI resin can have an amount of benzylic protons below 100 ppm. In one embodiment, the amount of benzylic protons ranges from more than 0 to below 100 ppm. In another embodiment, the amount of benzylic protons is not detectable.

The PEI resin can be substantially free (less than 100 ppm) of halogen atoms. The PEI resin can be free of halogen atoms. The PEI resin can have an amount of halogen atoms below 100 ppm. In one embodiment, the amount of halogen atoms range from more than 0 to below 100 ppm. In another embodiment, the amount of halogen atoms is not detectable.

Suitable PEIs that can be used in the disclosed composites include, but are not limited to, ULTEM PEIs. In a further embodiment, the ULTEM PEI is ULTEM 1000.

The polyetherimide can be present in the composition in any desired amount. For example, according to embodiments of the disclosure, the polyetherimide can be present in an amount in the range of from about 10 wt % up to about 90 wt % relative to the total weight of the composition, including further exemplary amounts of about 12 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, and 85 wt %. In still further embodiments, the polyetherimide can be present within any range of amount derived from any two of the above stated values. For example, the polyetherimide can be present in an amount in the range of from about 15 wt % to about 65 wt %, or in an amount in the range of from about 10 wt % to about 30 wt %, or in an amount in the range of from about 25 wt % to about 60 wt % relative to the total weight of the composition.

In one embodiment, the composition can optionally further comprise a polyetherimide-siloxane copolymer. The polyetherimide-siloxane copolymer can include a polyetherimide-siloxane copolymer having a siloxane content of greater than 0 and less than about 40 weight percent (wt %) based on the total weight of the block copolymer. The block copolymer comprises a siloxane block of Formula (11):

(11)

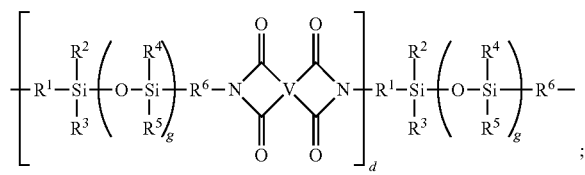

wherein $R^{1-6}$ are independently at each occurrence selected from the group consisting of substituted or unsubstituted, saturated, unsaturated, or aromatic monocyclic groups having 5 to 30 carbon atoms; substituted or unsubstituted, saturated, unsaturated, or aromatic polycyclic groups having 5 to 30 carbon atoms; substituted or unsubstituted alkyl groups having 1 to 30 carbon atoms; and substituted or unsubstituted alkenyl groups having 2 to 30 carbon atoms. V is a tetravalent linker selected from the group consisting of substituted or unsubstituted, saturated, unsaturated, or aromatic monocyclic and polycyclic groups having 5 to 50 carbon atoms; substituted or unsubstituted alkyl groups having 1 to 30 carbon atoms; substituted or unsubstituted alkenyl groups having 2 to 30 carbon atoms; and combinations comprising at least one of the foregoing linkers. g is any number including and between 1 to 30 and d is any number including and between 2 to 20. Commercially available siloxane PEIs can be obtained from SABIC Innovative Plastics under the brand name SILTEM* (*Trademark of SABIC Innovative Plastics IP B.V.)

For example, the polyetherimide-siloxane copolymer can be present in an amount in the range of from 0 wt % to 25 wt % relative to the total weight of the composition, including exemplary amounts of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, and 24 wt %. In still further embodiments, the polyetherimide-siloxane copolymer can be present within any range of amounts derived from any two of the above stated values. For example, the polyetherimide-siloxane copolymer can be present in an amount in the range of from about 0.1 wt % to about 10 wt %, in an amount in the range of from about 3 wt % to about 15 wt %, in an amount in the range of from about 4 wt % to about 10 wt %, or in an amount in the range of from about 2 wt % to about 6 wt %.

The composition comprises a polyester-polycarbonate polymer, also known as a polyester carbonate, copolyester polycarbonate, and copolyestercarbonate. The polyester polycarbonate polymer comprises isophthalate-terephthalate-resorcinol (ITR) ester units and carbonate units of the formula (14)

(14)

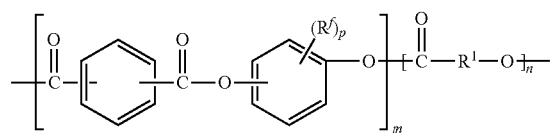

Wherein each $R^f$ is independently a halogen atom, a $C_1$ to $C_{12}$ hydrocarbon group, or a halogen-substituted $C_1$ to $C_{12}$ hydrocarbon group, p is 0 to 4, each $R^1$ is independently a $C_6$ to $C_{30}$ hydrocarbon group wherein at least 60% of the $R^1$ groups are aromatic, and m and n are each independently greater than one. In an embodiment, m is 2 to 500, and n is 2 to 500.

In a specfic embodiment, $R^f$ in formula (14) is a $C_1$ to $C_3$ alkyl group or a halogen-substituted $C_1$ to $C_3$ alkyl group, and p is 0 to 2. In another embodiment, p is zero.

The ITR ester units can be derived from the reaction of a mixture of terephthalic acid and isophthalic acid or a chemical equivalent thereof with a compound such as 05-t-butyl resorcinol, 2,4,5-trifluoro resorcinol, 2,4,6-trifluoro resorcinol, 4,5,6-trifluoro resorcinol, 2,4,5-tribromo resorcinol, 2,4, 6-tribromo resorcinol, 4,5,6 tribromo resorcinol, or a combination comprising at least one of the foregoing compounds.

In another specific embodiment, $R^1$ in formula (14) is derived from a dihydroxy compound of formula (15)

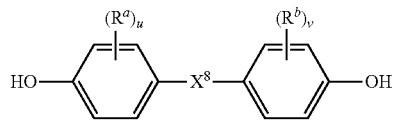

Wherein each $R^a$ and $R^b$ is independently a halogen atom or a $C_1$ to $C_{12}$ alkyl, and u and v are each independently integers of 0 to 4. Also in formula (15), $X^a$ represents a bridging group connecting the two hydroxy-substituted aromatic groups, wherein the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_1$ to $C_{18}$ organic group. The $C_1$ to $C_{18}$ organic bridging group can be cyclic (including fused rings) or acyclic, aromatic (including fused rings) or non-aromatic, and can further comprise heteroatoms such as halogens, oxygen, nitrogen, sulfur, silicon, or phosphorous. The $C_1$ to $C_{18}$ organic group can be disposed such that the $C_6$ arylene groups connected thereto are each connected to a common alkylidene carbon or to different carbons of the $C_1$ to $C_{18}$ organic bridging group.

In one embodiment, $R^a$ and $R^b$ are each independently a halogen or a $C_1$ to $C_3$ alkyl group, and u and v are each independently 0 to 1. In this or other embodiments, $X^a$ is a $C_1$ to $C_{18}$ alkylene group, a $C_3$ to $C_{18}$ cycloalkylene group, a fused $C_6$ to $C_{18}$ cycloalkylene group, a group of the formula —$B^1$—W—$B^2$— wherein $B^1$ and $B^2$ are the same or different $C_1$ to $C_6$ alkylene group and W is a $C_3$ to $C_{12}$ cycloalkylidene group or a $C_6$ to $C_{16}$ arylene group, a $C_3$ to $C_{18}$ cycloalkylidene, a $C_1$ to $C_{25}$ alkylidene of formula —C($R^c$)($R^d$) wherein $R^c$ and $R^d$ are each independently hydrogen, $C_1$ to $C_{12}$ allyl, $C_1$ to $C_{12}$ cycloalkyl, $C_7$ to $C_{12}$ arylalkyl, $C_1$ to $C_{12}$ heteroalkyl, or cyclic $C_7$ to $C_{12}$ heteroarylalkyl, or a group of the formula —C(=$R^e$)— Wherein $R^e$ is a divalent C1 to $C_{12}$ hydrocarbon group. Exemplary groups of this type include methylene, cyclohexylmethylene, ethylidene, neopentyl idene, and isopropylidene, as well as 2-[2.2.1]-bicycloheptyl idene, cyclohexylidene, cyclopentylidene, cyclododecylidene, and adamantylidene. The foregoing $X^a$ groups can be unsubstituted or substituted with one or more halogens, $C_1$ to $C_{12}$ alkyl groups, $C_6$ to $C_{18}$ aromatic groups, and/or heteroatom containing groups, such as ester, amide, and the like.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl) phenylmethane, 2,2-bis(4hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha,alpha'-bis(4hydroxyphenyl)toluene, bis(4-hydroxyphenyl)acetonitrile, 2,2-bis(3-methyl-4-hydroxyphenyl)propane, 2,2-bis(3ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'dihydroxy-3,3,3',3'-tetramethylspiro(bis)indane ("spirobiindane bisphenol"), 3,3,5-trimethylcyclohexylidenebisphenol, 3,3-bis(4-hydroxyphenyl)phthalide, 2,6-dihydroxydibenzo-p-dioxin, 2,6-dihydroxythianthrene, 2,7-dihydroxyphenoxathine, 2, 7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3, 5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds, 1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis (4-hydroxy-t-butylphenyl)propane, 3,3-bis(4-hydroxyphenyl)phthalimi dine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, $R^1$ is derived from bisphenol A.

In a specific embodiment of the polyester-polycarbonate polymer of formula (14), $R^f$ is a $C_1$ to $C_3$ alkyl group or a halogen substituted $C_1$ to $C_3$ alkyl group, p is 0 to 2, $R^a$ and $R^b$ are each independently a halogen or a $C_1$ to $C_3$ alkyl group, u and V are each independently 0 to 1, and $X^a$ is a $C_1$ to $C_{25}$ alkylidene of formula —C($R^c$)($R^d$)— wherein $R^c$ and $R^d$ are each independently hydrogen, $C_1$ to $C_{12}$ alkyl, or $C_7$ to $C_{12}$ arylalkyl. In another embodiment, p is zero, u and V are each zero, and $X^a$ is a $C_1$ to $C_{13}$ alkylidene of formula —C($R^c$)($R^d$)— wherein $R^c$ and $R^d$ are each independently hydrogen or $C_1$ to $C_6$ alkyl, specifically methyl.

Chain stoppers (also referred to as capping agents), which limit molecular weight growth rate during manufacture of the polymer can be used. Suitable chain stoppers include monophenolic compounds such as phenol, p-cumyl-phenol, p-tertiary-butyl phenol, and hydroxy diphenyl, monoethers of hydroquinones such as p-methoxyphenol, allyl-substituted phenols including those with branched chain alkyl substituents having 8 to 9 carbon atoms, mono-phenolic UV absorber such as 4-substituted-2-hydroxybenzophenone, aryl salicylate, monoesters of diphenols such as resorcinol monobenzoate, 2-(2-hydroxyaryl)-benzotriazole, 2-(2-hydroxyaryl)1,3,5-triazines, and the like; monocarboxylic acid chlorides such as benzoyl chloride, $C_1$ to $C_{22}$ alkyl-substituted benzoylchlorides (e.g., 4-methylbenzoyl chloride), halogen-substituted benzoyl chlorides (e.g., bromobenzoyl chloride), cinnamoyl chloride, 4-nadimidobenzoyl chloride, trimellitic anhydride chloride, and chlorides of aliphatic monocarboxylic acids with up to 22 carbon atoms; and monochloroformates such as phenyl chloroformate, $C_1$ to $C_{22}$ alkyl-substituted phenyl chloroformate, p-cumyl phenyl chloroformate, toluene chloroformate, and the like. Specific monophenolic chain stoppers include phenol, p-cumylphenol, and resorcinol monobenzoate.

The polyester-polycarbonate polymers can have a weight average molecular weight (MW) of 1,500 to 100,000 atomic mass units, specifically 1,700 to 50,000 atomic mass units, and more specifically 2,000 to 40,000 atomic mass units. Molecular Weight determinations are performed using gel permeation chromatography (GPC), using a crosslinked styrene-divinylbenzene column and calibrated to polystyrene references. Samples are prepared at a concentration of about 1 milligram per milliliter (mg/ml), and are eluted at a flow rate of about 1.0 milliliter per minute (ml/min).

The poly(isophthalate-terephthalate-resorcinol ester)s can be obtained by interfacial polymerization or melt-process condensation, by solution phase condensation, or by transesterification polymerization. It is possible to use a branched poly(isophthalate-terephthalate-resorcinol ester)s in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the poly(isophthalate-terephthalate resorcinol ester)s, depending on the ultimate end use of the composition.

The poly(isophthalate-terephthalate-resorcinol ester)s can then be reacted with a carbonate precursor in the presence of a suitable dihydroxy compound such as an aromatic diol of formula (15). Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. It is also desirable to include a chain stopper in addition to the dihydroxy compound. In a specific embodiment, a poly(isophthalate-terephthalate-resorcinol ester) is prepared by solution phase condensation, i.e., is prepared by contacting a mixture of isophthalic acid and terephthalic acid with resorcinol in a suitable solvent. To the resulting mixture is then added BPA, phenol (chain stopper), and phosgene (carbonyl chloride, a carbonate precursor). Poly(isophthalate-terephthalate-resorcinol ester)-co-(bisphenol-A carbonate) is thus produced.

In one embodiment, the ratio of ITR ester units (m) to the carbonate units (n) in the polyester-polycarbonate is 95:05 to 40:60, including exemplary amounts of 90:10, 85:15, 80:20, 75:25, 70:30, 65:35, 60:40, 55:45, 50:50, and 45:55. In still further embodiments, the range can be derived from any two of the above stated ratios. For example, the ratio of ITR ester units (m) to the carbonate units (n) in the polyester-polycarbonate is 90:10 to 45:55.

In one embodiment, the polyester carbonate comprises at least 40 mole % resorcinol based aryl ester linkages. In another embodiment, the polyester carbonate comprises the resorcinol based aryl ester linkages in an amount ranging from 40 mole % to 95 mole % based on the total mole % of the polyester carbonate, including exemplary values of 45 mole %, 55 mole %, 60 mole %, 65 mole %, 70 mole %, 75 mole %, 80 mole %, 85 mole %, and 90 mole %. In still further embodiments, the range can be derived from any two of the above stated values. For example, the polyester carbonate can comprise the resorcinol based aryl ester linkages in an amount ranging from 45 mole % to 90 mole % or 40 mole % to 90 mole % based on the total mole % of the polyester carbonate.

The polyester carbonate can be present in the composition in any desired amount. For example, according to embodiments of the disclosure, the polyester carbonate can be present in an amount in the range of from about 10 wt % up to about 70 wt % relative to the total weight of the composition, including further exemplary amounts of about 15 wt %, 20 wt %, 25 wt %, 30 wt %, 35 wt %, 40 wt %, and 45 wt %, 50 wt %, 55 wt %, 60 wt %, and 65 wt %. In still further embodiments, the polyester carbonate can be present within any range of amount derived from any two of the above stated values. For example, the polyester carbonate can be present in an amount in the range of from about 15 wt % to about 65 wt %, or in an amount in the range of from about 10 wt % to about 30 wt %, or in an amount in the range of from about 20 wt % to about 50 wt % relative to the total weight of the composition.

In one embodiment, the disclosed composition can optionally further comprise a polycarbonate-siloxane copolymer. As used herein, the term polycarbonate-siloxane copolymer is equivalent to polysiloxane-polycarbonate copolymer, polycarbonate-polysiloxane polymer, polycarbonate-polysiloxane copolymer, or polysiloxane-polycarbonate polymer. The polycarbonate-siloxane copolymer comprises polydiorganosiloxane blocks comprising structural units of the general formula (I) below:

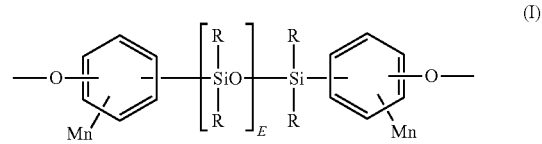

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4.

The polycarbonate-siloxane copolymer also comprises polycarbonate blocks comprising structural units of the general formula (II) below:

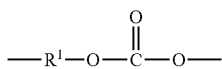

(II)

wherein at least 60 percent of the total number of $R^1$ groups comprise aromatic moieties and the balance thereof comprise aliphatic, alicyclic, or aromatic moieties According to exemplary non-limiting embodiments of the disclosure, the polycarbonate-siloxane copolymer comprises diorganopolysiloxane blocks of the general formula (III) below:

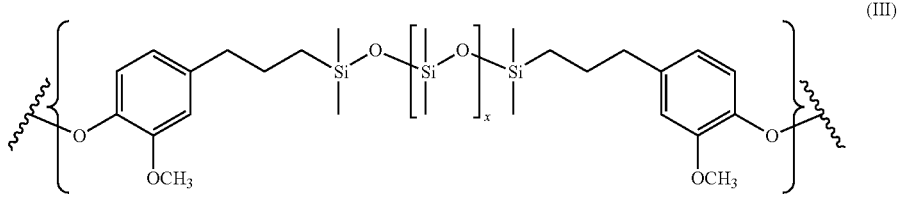

(III)

wherein x represents an integer from about 20 to about 60. The polycarbonate blocks according to these embodiments can be derived from bisphenol-A monomers.

Diorganopolysiloxane blocks of formula (III) above can be derived from the corresponding dihydroxy compound of formula (IV):

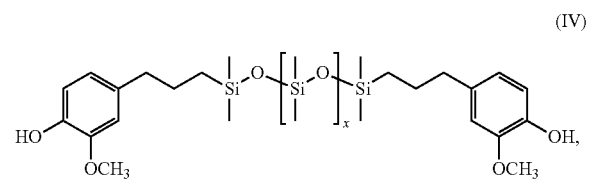

(IV)

wherein x is as described above. Compounds of this type and others are further described in U.S. Pat. No. 4,746,701 to Kress, et al and U.S. Pat. No. 8,017,697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxypolysiloxanes can be made by effecting a platinum catalyzed addition between a siloxane hydride of the formula (V):

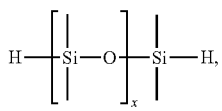

(V)

wherein x is a previously defined, and an aliphatically unsaturated monohydric phenol such as eugenol to yield a compound of formula (IV).

The polycarbonate-siloxane copolymer may be manufactured by a reaction of a diphenolic polysiloxane, such as that depicted by formula (IV), with a carbonate source and a dihydroxy aromatic compound such as bisphenol-A, optionally in the presence of a phase transfer catalyst as described above. Suitable conditions are similar to those useful in forming polycarbonates. For example, the copolymers can be prepared by phosgenation at temperatures from below 0° C. to about 100° C., including for example, at temperatures from about 25° C. to about 50° C. Since the reaction is exothermic, the rate of phosgene addition can be used to control the reaction temperature. The amount of phosgene required will generally depend upon the amount of the dihydric reactants. Alternatively, the polycarbonate-siloxane copolymers can be prepared by co-reacting, in a molten state, the dihydroxy monomers and a diaryl carbonate ester, such as diphenyl carbonate, in the presence of a transesterification catalyst as described above.

In the production of the polycarbonate-siloxane copolymer, the amount of dihydroxydiorganopolysiloxane can be selected so as to provide the desired amount of diorganopolysiloxane units in the copolymer. The particular amounts used will therefore be determined depending on desired physical properties of the composition, the value of x (for example, within the range of about 20 to about 60), and the type and relative amount of each component in the composition, including the type and amount of polycarbonate, type and amount of polycarbonate-siloxane copolymer, and type and amount of any other additives. Suitable amounts of dihydroxydiorganopolysiloxane can be determined by one of ordinary skill in the art without undue experimentation using the guidelines taught herein.

For example, according to embodiments of the disclosure, the polycarbonate-siloxane copolymer can be provided having any desired level of siloxane content. For example, the siloxane content can be in the range of from 4 mole % to 30 mole %. In additional embodiments, the siloxane content of the polycarbonate-siloxane copolymer can be in the range of from 4 mole % to 20 mole %. In still further embodiments, the siloxane content of the polycarbonate-siloxane copolymer can be in the range of from 4 mole % to 8 mole %. In a further embodiment, the polycarbonate-siloxane copolymer comprises a diorganosiloxane content in the range of from 5 to 7 mole wt %. In an even further exemplary embodiment, the siloxane content of the polycarbonate-siloxane copolymer can be about 6 mole %. Still further, the diorganopolysiloxane blocks can be randomly distributed in the polycarbonate-siloxane copolymer.

The disclosed polycarbonate-siloxane copolymer can also be end-capped as similarly described in connection with the manufacture of polycarbonates set forth herein. For example, according to embodiments of the disclosure, a polycarbonate-siloxane copolymer can be end capped with p-cumyl-phenol.

A non-limiting example of a polycarbonate-siloxane copolymer includes transparent EXL, available from SABIC Innovative Plastics. The transparent EXL from SABIC is a polycarbonate-polysiloxane (9030T) copolymer, having been tested commercially and found to have about 6 mole % siloxane, a Mw of about 44,600, and a Mn of about 17800 in a polystyrene standard using chloroform solvent.

The polycarbonate-siloxane copolymer can be present in the polymer composition in any desired amount. For example, the polycarbonate-siloxane copolymer can be present in an amount in the range of from 0 weight % to 25 weight % relative to the total weight of the composition, including exemplary amounts of 1 weight %, 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 21 weight %, 22 weight %, 23 weight %, and 24 weight %. In still further embodiments, the polycarbonate-siloxane copolymer can be present within any range of amounts derived from any two of the above stated values. For example, the polycarbonate-siloxane copolymer can be present in an amount in the range of from about 7 weight % to about 19 weight %, in an amount in the range of from about 3 weight % to about 15 weight %, in an amount in the range of from about 4 weight % to about 10 weight %, or in an amount in the range of from about 8 weight % to about 18 weight %.

In one embodiment, the disclosed composition comprises at least one reinforcement agent. The reinforcement agent can be fibrous or non-fibrous or a combination thereof. In one embodiment, the reinforcement agent can be fibrous. In another embodiment, the reinforcement agent can be fibrous and non-fibrous. The reinforcement agent can comprise inorganic fibrous materials, non-melting and high-melting organic fibrous materials. Reinforcement agents include, but are not limited to glass fiber, carbon fiber, asbestos fiber, silica fiber, alumina fiber, zirconia fiber, boron nitride fiber, silicon nitride fiber, boron fiber, fluorocarbon resin fiber, and potassium titanate fiber. In one embodiment, the reinforcement agent comprises carbon fiber (CF). In another embodiment, the reinforcement agent comprises glass fiber. In still further embodiments, the carbon fibers can comprise polyacrylonitrile (PAN) based carbon fibers. In a further embodiment, the reinforcement agent comprises a carbon fiber or a glass fiber or a combination thereof.

In some embodiments, the reinforcement agent comprises carbon fibers having a tensile modulus in the range of from 172 gigapascal (GPa) to 331 GPa (25 to 48 million pounds per square inch (MSI)), including exemplary values of 200, 207, 214, 221, 228, 234, 241, 248, 255, 262, 269, 276, 283, 290, 296, 303, 310, 317 and 324 GPa (29, 30, 31, 32, 33, 34, 35, 36, 37, 38, 39, 40, 41, 42, 43, 44, 45, 46, and 47 MSI). In further embodiments, the tensile modulus can be in a range derived from any two of the above listed exemplary values, for example, the reinforcement agent can comprise carbon fibers having a tensile modulus in the range of from 221 to 310 GPa (32 to 45 MSI), or tensile modulus in the range of from 241 to 290 GPa (35 to 42 MSI).

In other embodiments, the reinforcement agent comprises carbon fiber demonstrating a tensile strength in the range of from 2758 to 8274 MPa (400 to 1200 kilopounds per square inch (KSI)), including exemplary values of 3447, 4137, 4826, 5516, 6205, 6895 and 7584 MPa (500, 600, 700, 800, 900, 1000, and 1100 KSI). In further embodiments, the tensile strength can be in a range derived from any two of the above listed exemplary values, for example, the reinforcement agent can comprise carbon fiber demonstrating a tensile strength in the range of from 3447 to 6895 MPa (500 to 1000 KSI), or tensile strength in the range of from 4826 to 6205 MPa (700 to 900 KSI).

In some embodiments, the reinforcement agent comprises glass fiber having a tensile modulus in the range of from 62.1 to 103 GPa (9 to 15 MSI), including exemplary values of 68.9, 75.8, 82.7, 89.6 and 96.5 GPa (10, 11, 12, 13, and 14 MSI). In still further embodiments, the tensile modulus can be in a range derived from any two of the above listed exemplary values, for example, the reinforcement agent can comprise glass fiber having a tensile modulus in the range of from 68.9 to 96.5 GPa (10 to 14 MSI), or 75.8 to 89.6 GPa (11 to 13 MSI).

In other embodiments, the reinforcement agent comprises glass fiber having a tensile strength in the range of from 1724 to 6205 MPa (250 to 900 KSI), including exemplary values of 2758, 3447, 4137, 4826 and 5516 MPa (400, 500, 600, 700, and 800 KSI). In further embodiments, the tensile strength can be in a range derived from any two of the above listed exemplary values, for example, the reinforcement agent comprises glass fiber having a tensile strength in the range of from 2758 to 4826 MPa (400 to 700 KSI), or in the range of from 3102 to 4482 MPa (450 to 650 KSI).

Non-limiting examples of commercially available cabon fiber include HexTow™ IM7, commercially available from the Hexcel Corporation, and having a tensile modulus of about 276 GPa (40 MSI) and TORAYCA™ T800S, commercially available from Toray Carbon Fibers America, Inc., (a wholly owned subsidiary of Toray Industries, Inc.) and having a tensile modulus of about 290 GPa (42 MSI).

Non-limiting example of commercially available glass fiber include ChopVantage® HP 3540, commercially available from PPG Industries, and having a tensile modulus of about 68.9 GPa (10 MSI) and a tensile strength of about 2068 MPa (300 KSI).

In a further embodiment, the reinforcement agent is present in an amount from 1 wt % to about 70 wt %, relative to the total weight of the composition, including exemplary values of 2 wt %, 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In further embodiments, the weight percentage can be in a range derived from any two of the above listed exemplary wt % values. In a still further embodiment, the reinforcement agent is present in an amount ranging from 1 wt % to about 60 wt %, relative to the total weight of the composition. In a yet further embodiment, the reinforcement agent is present in an amount ranging from 1 wt % to about 50 wt %, relative to the total weight of the composition. In an even further embodiment, the reinforcement agent is present in an amount from greater than 0 wt % to about 30 wt %. In another embodiment, the composition comprises the reinforcement agent in an amount ranging from 5 wt % to 35 wt % relative to the total weight of the composition.

In a one embodiment, the carbon fiber is present in an amount from greater than 0 wt % to about 70 wt %, relative to the total weight of the composition, including exemplary values of 1 wt %, 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In further embodiments, the weight percentage can be in a range derived from any two of the above listed exemplary wt % values. In a still further embodiment, the carbon fiber is present in an amount ranging from greater than 0 wt % to about 60 wt %, relative to the total weight of the composition. In a yet further embodiment, the carbon fiber is present in an amount ranging from greater than 0 wt % to about 50 wt %, relative to the total weight of the composition. In an even further embodiment, the carbon fiber is present in an amount from greater than 0 wt % to about 30 wt %.

In a one embodiment, the glass fiber is present in an amount from 0 wt % to about 70 wt %, relative to the total weight of the composition, including exemplary values of 1 wt %, 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In further embodiments, the weight percentage can be in a range derived from any two of the above listed exemplary wt % values. In a still further embodiment, the glass fiber is present in an amount ranging from 1 wt % to about 60 wt %, relative to the total weight of the composition. In a yet further embodiment, the glass fiber is present in an amount ranging from 5 wt % to about 50 wt %, relative to the total weight of the composition. In an even further embodiment, the glass fiber is present in an amount from 10 wt % to about 30 wt %.

The disclosed composition can optionally comprise one or more additives conventionally used in the manufacture of molded polymer parts with the proviso that the optional additives do not adversely affect the desired properties of the resulting composition. Mixtures of optional additives can also be used. Such additives can be mixed at a suitable time during the mixing of the components for forming the composite mixture. For example, the disclosed composition can comprise one or more fillers, plasticizers, stabilizers, antistatic agents, flame-retardants, impact modifiers, colorant, antioxidant, and/or mold release agents. In one embodiment, the composition further comprises one or more optional additives selected from an antioxidant, impact modifier, flame retardant, inorganic filler, or stabilizer, or a combination thereof.

Exemplary heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Exemplary antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing can be used in a polymeric resin containing chemical antistatic agents to render the composition electrostatically dissipative.

Exemplary mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy] methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl) oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Exemplary impact modifiers of the present disclosure include but not limited to, for example, an acrylonitrile-butadiene-styrene polymer (ABS), an acrylonitrile-styrene-butyl acrylate (ASA) polymer, a methyl methacrylate-acrylonitrile-butadiene-styrene (MABS) polymer, a methyl methacrylate-butadiene-styrene (MBS) polymer, and an acrylonitrile-ethylene-propylene-diene-styrene (AES) polymer. In a still further embodiment, the impact modifier is an acrylonitrile-butadiene-styrene polymer ("ABS polymer"). In a still further embodiment, a suitable impact modifier is a bulk polymerized ABS polymer ("BABS polymer" or "Bulk ABS polymer").

As noted above, the disclosed composition can optionally further comprises a flame retardant additive. In various embodiments, the flame retardant additive can comprise any flame retardant material or mixture of flame retardant materials suitable for use in the composition. In another embodiment, the flame retardant additive comprises a phosphate containing material. In another embodiment, the flame retardant additive comprises a halogen containing material.

In one embodiment, a flame retardant additive includes, for example, flame retardant salts such as alkali metal salts of perfluorinated $C_{1-6}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS, alone or in combination with other flame retardants, are useful in the compositions disclosed herein.

In another embodiment, a flame retardant additive can also include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

In other embodiments, the flame retardant additive is free of or substantially free of one or more of phosphate and/or a halogen. In still another embodiment, the flame retardant additive comprises an oligomer organophosphorous flame retardant, including for example, bisphenol A diphenyl phosphate (BPADP). In a further embodiment, the flame retardant is selected from oligomeric phosphate, polymeric phosphate, oligomeric phosphonate, or mixed phosphate/phosphonate ester flame retardant composition. In a still further embodiment, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further embodiment, the flame retardant is bisphenol-A bis(diphenyl phosphate).

The compositions disclosed herein can be used to make the articles disclosed herein.

Also disclosed herein is an article comprising one or more compositions described herein. In one embodiment, the article is selected from the group consisting of electric equipment, electronic equipment, office equipment, automobile equipment, industrial equipment.

In one embodiment, the article comprises a metal replacement in a device. As used herein, an article is a metal replacement if the article is used as a substitute for any part that includes any percentage of metal in a device. In another embodiment, the article comprises an automotive device, aircraft device, or a healthcare device. In a further embodiment, the article comprises various structural parts in automotive, healthcare, consumer electronics, and aerospace applications. In a yet further embodiment, the article can be used in the seat back frame of automotive or aircraft seats. In an even further embodiment, the article can be used in a medical device. The medical device could be medical fixation, a surgical stapler, or an insulin pen. In another embodiment, the article can comprise a laptop cover or a hard disk drive. In one embodiment, the article can be a structural component in the hard disk drive.

In one embodiment, the article comprises the composition disclosed herein.

The disclosed compositions and articles include at least the following embodiments.

Embodiment 1: A composition comprising a polyetherimide, a polyester carbonate, and a reinforcement agent; wherein the composition comprises the reinforcement agent in an amount ranging from 1 wt % to 70 wt % relative to the total weight of the composition; and wherein the polyester carbonate comprises at least 40 mole % resorcinol based aryl ester linkages.

Embodiment 2: A composition comprising a polyetherimide, a polyester carbonate, and a reinforcement agent; wherein the composition comprises the polyetherimide in an amount ranging from 25 wt % to 60 wt % relative to the total weight of the composition; wherein the composition comprises the polyester carbonate in an amount ranging from 20 wt % to 50 wt % relative to the total weight of the composition, and the polyester carbonate comprises at least 40 mole % resorcinol based aryl ester linkages; and wherein the composition comprises the reinforcement agent in an amount ranging from 1 wt % to 70 wt % relative to the total weight of the composition.

Embodiment 3: The composition of any of embodiments 1-2, wherein the reinforcement agent comprises a carbon fiber or a glass fiber or a combination thereof.

Embodiment 4: The composition of any one of embodiments 1-3, wherein the polyester carbonate comprises the resorcinol based aryl ester linkages in an amount ranging from 40 mole % to 95 mole % based on the total mole % of the polyester carbonate.

Embodiment 5: The composition of any one of embodiments 1-4, wherein the composition comprises the reinforcement agent in an amount ranging from 5 wt % to 35 wt % relative to the total weight of the composition.

Embodiment 6: The composition of any one of embodiments 1 and 3-5, wherein the composition comprises the polyetherimide in an amount ranging from 10 wt % to 90 wt % relative to the total weight of the composition.

Embodiment 7: The composition of any one of embodiments 1 and 3-6, wherein the composition comprises the polyetherimide in an amount ranging from 25 wt % to 60 wt % relative to the total weight of the composition.

Embodiment 8: The composition of any one of embodiments 1 and 3-7, wherein the composition comprises the polyester carbonate in an amount ranging from 10 wt % to 70 wt % relative to the total weight of the composition.

Embodiment 9: The composition of any one of embodiments 1-8, wherein the composition comprises the polyester carbonate in an amount ranging from 20 wt % to 50 wt % relative to the total weight of the composition.

Embodiment 10: The composition of any one of embodiments 1-9, wherein the composition further comprises a polyetherimide-siloxane copolymer.

Embodiment 11: The composition of embodiment 10, wherein the polyetherimide-siloxane copolymer is present in an amount ranging from 0.1 wt % to 10 wt % relative to the total weight of the composition.

Embodiment 12: The composition of any one of embodiments 1-11, wherein the composition further comprises a polycarbonate-siloxane copolymer.

Embodiment 13: The composition of embodiment 12, wherein the polycarbonate-siloxane copolymer is present in an amount ranging from 1 wt % to 15 wt % relative to the total weight of the composition.

Embodiment 14: The composition of any one of embodiments 1-13, wherein the composition further comprises one or more additional additives comprising an antioxidant, impact modifier, flame retardant, inorganic filler, or stabilizer, or a combination thereof.

Embodiment 15: The composition of any one of embodiments 1-14, wherein the composition demonstrates a tensile strength in an amount ranging from 120 MPa to 350 MPa.

Embodiment 16: The composition of any one of embodiments 1-15, wherein the composition demonstrates a flexural strength in an amount ranging from 200 MPa to 425 MPa.

Embodiment 17: The composition of any one of embodiments 1-16, wherein the composition demonstrates a higher tensile strength compared to a substantially identical reference composition in the absence of one or more of the polyetherimide, the polyester carbonate, and the reinforcement agent.

Embodiment 18: The composition of any one of embodiments 1-17, wherein the composition demonstrates a higher flexural strength compared to a substantially identical reference composition in the absence of one or more of the polyetherimide, the polyester carbonate, and the reinforcement agent.

Embodiment 19: The composition of any one of embodiments 1-18, wherein the composition demonstrates a higher melt volume rate compared to a substantially identical reference composition in the absence of the polyester carbonate.

Embodiment 20: The composition of any one of embodiments 1-19, wherein the composition demonstrates a higher notched izod impact strength compared to a substantially identical reference composition in the polyester carbonate.

Embodiment 21: The composition of any one of embodiments 1-20, wherein the composition demonstrates a stronger fiber-resin adhesion compared to a substantially identical reference composition in the absence the polyester carbonate.

Embodiment 22: The composition of any one of embodiments 2-21, wherein the carbon fiber demonstrates a tensile strength in an amount ranging from 2758 to 8274 MPa (400 KSI to 1200 KSI).

Embodiment 23: An article comprising the composition of any one of embodiments 1-21.

Embodiment 24: The article of embodiment 23, wherein the article comprises a metal replacement in a device.

Embodiment 25: The article of any one of embodiments 23-24, wherein the article comprises an automotive device, aircraft device, or a healthcare device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Examples 1-10 a. Materials and Methods

The materials shown in Table 1 were used to prepare the compositions described herein.

TABLE 1

| Abbreviation | Description | Source |
|---|---|---|
| PEI | Ultem ™ 1000; Polyetherimide resin made by condensation of 2,2-bis [4-(3,4-dicarboxyphenoxy)phenyl] propane dianhydride with metaphenylene diamine and having a molecular weight of about 54,000 Da. | SABIC |
| PC | Lexan ™ 144; Polycarbonate resin derived from bisphenol A and phosgene and having average molecular weight of about 35,000 g/mole. | SABIC |
| ITR-PC | SLX 90/10 PCP capped 20M powder; Resorcinol based polyester carbonate - a copolymer with 90% ITR and 10% carbonate linkage | SABIC |
| CF | HexTow IM7 intermediate modulus chopped carbon fiber of ~6 mm cut length having a tensile modulus of 276 GPa (40 MSI) and a tensile strength of 5667 MPa (822 KSI). | Hexel Corp. |

Examples 1-7 were prepared using the reactant amounts shown in Table 2, and using the materials described in Table 1. The values given under each example number are the amount of each item in pounds that was under the indicated example number in wt % of the whole composition.

TABLE 2

| Item | Example Number | | | | | | |
|---|---|---|---|---|---|---|---|
| | 1 | 2 | 3 | 4 | 5 | 6 | 7 |
| PEI | 50 | 50 | 80 | | | 42.3 | 42.3 |
| PC | 50 | | | 80 | | 37.6 | |
| ITR-PC | | 50 | | | 80 | | 37.6 |
| CF | | | 20 | 20 | 20 | 20 | 20 |

In Table 2, Example 1 comprised a 50/50 blend of PEI/PC and Example 2 comprised a 50/50 blend of PEI/ITR-PC; Example 3 comprised PEI and CF; Examples 4 and 5 comprised CF in PC and ITR-PC respectively; Example 6 comprised PEI, PC and CF; and Example 7 comprised PEI, ITR-PC, and CF.

The examples were compounded using a ten-barrel 40 mm twin screw extruders. The PEI, PC, ITR-PC, PEI/PC, PEI/ITR-PC blends were added at the feed throat of the extruder. The CF was added via a side feeder. The PEI/CF compositions were extruded with a barrel temperature of 680° F. The PC/CF and ITR-PC/CF compositions were extruded with a barrel temperature of 550° F. The PEI/PC, PEI/ITR-PC, PEI/PC/CF and PEI/ITR-PC compositions were extruded with a barrel temperature of 600° F. The screw temperature was 200 rpm and the feed rate was 100 lbs/hr.

The examples were injection molded with a barrel temperature of 570° F. for the PC/CF and ITR-PC/CF ompositions, 620° F.-650° F. for the PEI/PC and PEI/ITR-PC compositions, 670° F.-720° F. for the PEI/CF, PEI/PC/CF and PEI/ITR-PC/CF compositions. The mold temperature ranged from 200° F.-225° F. for the PC/CF and ITR-PC/CF compositions and 300° F.-325° F. for the PEI/PC compositions, PEI/ITR-PC compositionos, PEI/CF compositions, PEI/PC/CF compositions and PEI/ITR-PC/CF compositions b. Tensile and Flexural Strength The tensile strength and flexural strength are shown in Table 3 of neat PEI, neat PC, neat ITR-PC and 50/50 blends of PEI/PC and PEI/ITR-PC

TABLE 3

| Property | Unit | PEI | PC | PEI/PC (50/50) | % change due to blending with PC | ITR-PC | PEI/ITR-PC (50/50) | % change due to blending with ITR-PC |
|---|---|---|---|---|---|---|---|---|
| Tensile Strength | MPa | 84 | 63 | 70 | −17 | 66 | 74 | −12 |
| Flexural Strength | MPa | 165 | 103 | 120 | −27 | 119 | 140 | −15 |

Tensile strength was determined in accordance with ASTM D638. Flexural strength was determined in accordance with ASTM 790.

As shown in Table 3, the tensile strength and flexural strength showed a reduction for the PEI/PC blend and PEI/ITR-PC blend when compared to the neat PEI. The tensile strength and flexural strength of the PEI/PC blend and PEI/ITR-PC blend falls between the tensile strength and flexural strength of the neat PEI and the neat PC/neat ITR-PC.

FIG. 1 shows the flexural strength of PC/CF, ITR-PC/CF, PEI/CF, PEI/PC/CF and PEI/ITR-PC/CF compositions (Examples 3-7). As shown in FIG. 1, the flexural strength of the PEI/PC/CF composition falls between the flexural strength of the PEI/CF and PC/CF compositions; Surprisingly the flexural strength of the PEI/ITR-PC/CF composition was higher than the flexural strength of the composition comprising PEI/CF or the composition comprising ITR-PC/CF.

Figure 2:
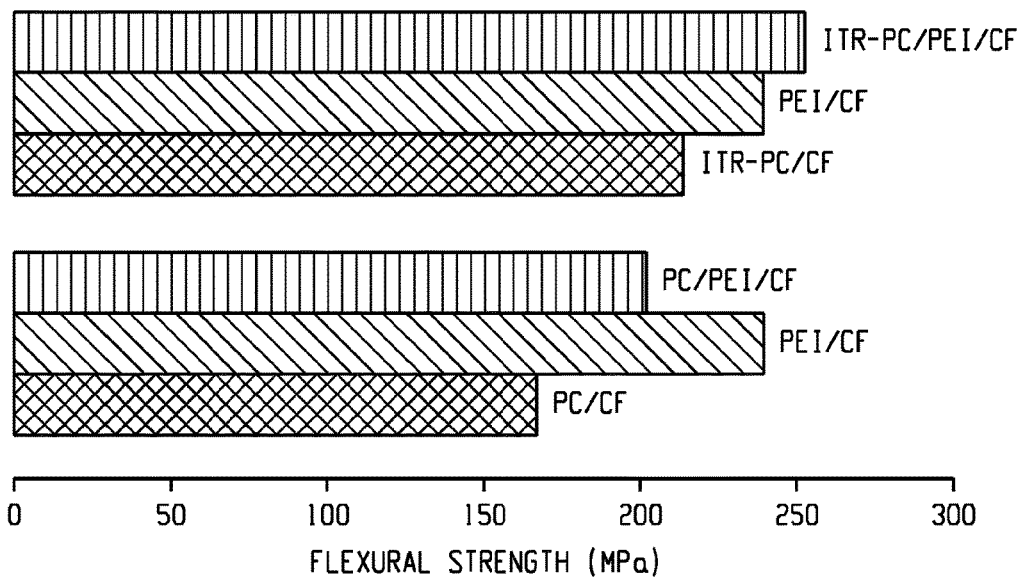
FIG. 2 shows the tensile strength of PC/CF, ITR-PC/CF, PEI/CF, PEI/PC/CF and PEI/ITR-PC/CF compositions.

FIG. 2 shows the tensile strength of PC/CF, ITR-PC/CF, PEI/CF, PEI/PC/CF and PEI/ITR-PC/CF compositions (Examples 3-7). As shown in FIG. 2, the tensile strength of the PEI/PC/CF composition falls between the tensile strength of the PEI/CF and PC/CF compositions; Surprisingly the tensile strength of the PEI/ITR-PC/CF composition was higher than the tensile strength of the composition comprising PEI/CF or the composition comprising ITR-PC/CF.

Figure 3:
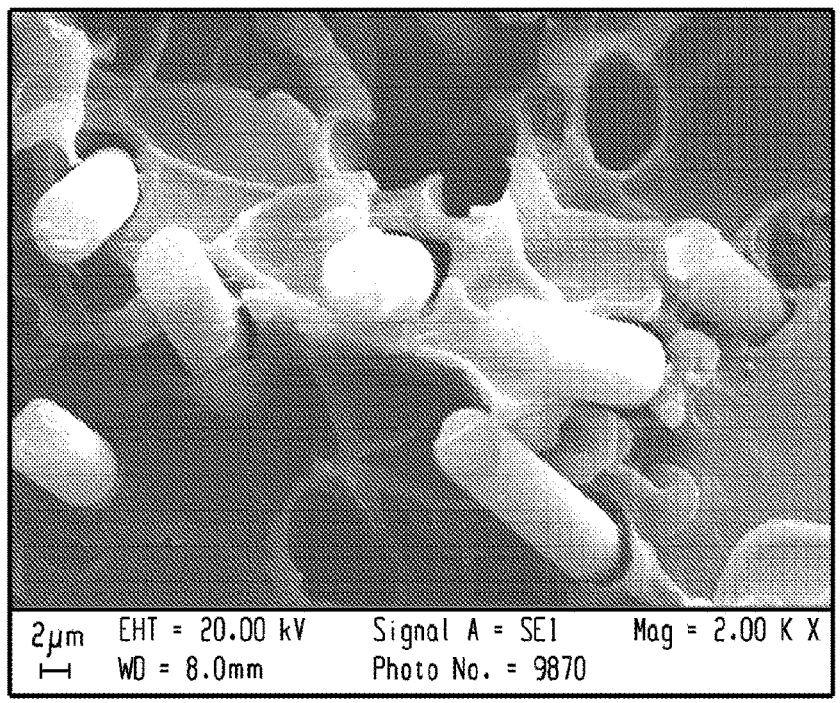
FIG. 3 shows the fracture surface morphology of PEI/CF composition as probed by using a Scanning Electron Microscope (SEM).
Figure 4:
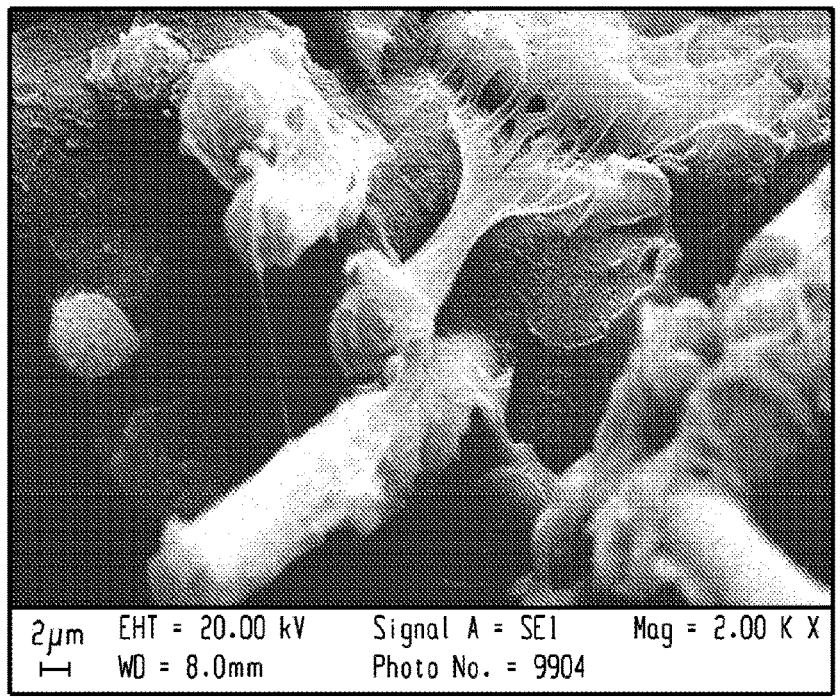
FIG. 4 shows the fracture surface morphology of PEI/ITR-PC/CF composition as probed by using a Scanning Electron Microscope (SEM).

FIGS. 3-4 show the SEM micrographs of the fracture surface (cryofractured) of the PEI/CF and PEI/ITR-PC/CF compositions. The fracture surface morphology of the composition was studied using a FEI Quanta™ 400 Environmental Scanning Electron Microscope (SEM). As shown in FIGS. 3-4, the SEM micrographs provided information on the fiber-resin adhesion. FIG. 3 indicated weak adhesion between the CF and the PEI. In FIG. 3, the SEM micrograph showed a small overlap of the PEI over the CF at the intersection of the CF and PEI, but no PEI was observed at the surface of the CF. FIG. 4 indicates strong adhesion between the CF and the resin blend comprising PEI and ITR-PC. In FIG. 4, the SEM micrograph showed some resin blend at the surface of the CF and an overlap of the resin blend over the CF. The strong adhesion could contribute to the increased tensile strength and the increased flexural strength of the composition comprising PEI, ITR-PC, and CF compared to the composition comprising PEI and CF or the composition comprising ITR-PC and CF.

c. Flow Rate and Notched Izod Impact

The flow and notched izod impact strength of composition 3 and 7 are shown in Table 4. Melt volume flow rate (MVR) was determined in accordance with ASTM D1238. The notched izod impact strength was determined in accordance with ASTM D256.

TABLE 4

| Property | Unit | PEI/CF | PEI/ITR-PC/CF | % change relative to PEI/CF |
|---|---|---|---|---|
| Melt Volume Rate (345° C., 10 kg) | cm³/10 min | 3 | 50 | 1567 |
| Notched Izod Impact Strength | J/m | 78 | 109 | 40 |

As shown in Table 4, the flow rate and notched izod impact strength showed an improvement for the composition comprising PEI, ITR-PC, and CF when compared to the composition comprising PEI and CF. Table 4 showed that the 20% carbon fiber loaded PEI/ITR-PC composition exhibited a 40% improvement in notched izod impact strength and ~1500% improvement in flow rate when measured at 345° C. and 10 kg load.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A composition comprising a polyetherimide, a polyester carbonate, and a reinforcement agent;
   wherein the composition comprises the reinforcement agent in an amount ranging from 1 wt % to 70 wt % relative to the total weight of the composition;
   wherein the reinforcement agent comprises a carbon fiber or a glass fiber or a combination thereof;
   wherein the polyester carbonate comprises at least 40 mole % resorcinol based aryl ester linkages; and
   wherein the composition demonstrates a flexural strength ranging from 200 MPa to 425 MPa.

2. The composition of claim 1, wherein the composition comprises the polyetherimide in an amount ranging from 25 wt % to 60 wt % relative to the total weight of the composition; and wherein the composition comprises the polyester carbonate in an amount ranging from 20 wt % to 50 wt % relative to the total weight of the composition.

3. The composition of claim 1, wherein the polyester carbonate comprises the resorcinol based aryl ester linkages in an amount ranging from 40 mole % to 95 mole % based on the total mole % of the polyester carbonate.

4. The composition of claim 1, wherein the composition comprises the reinforcement agent in an amount ranging from 5 wt % to 35 wt % relative to the total weight of the composition.

5. The composition of claim 1, wherein the composition further comprises a polyetherimide-siloxane copolymer.

6. The composition of claim 5, wherein the polyetherimide-siloxane copolymer is present in an amount ranging from 0.1 wt % to 10 wt % relative to the total weight of the composition.

7. The composition of claim 1, wherein the composition further comprises a polycarbonate-siloxane copolymer.

8. The composition of claim 7, wherein the polycarbonate-siloxane copolymer is present in an amount ranging from 1 wt % to 15 wt % relative to the total weight of the composition.

9. The composition of claim 1, wherein the composition further comprises one or more additional additives comprising an antioxidant, impact modifier, flame retardant, inorganic filler, or stabilizer.

10. The composition of claim 1, wherein the composition demonstrates a tensile strength ranging from 120 MPa to 350 MPa.

11. The composition of claim 1, wherein the composition demonstrates a higher tensile strength compared to a substantially identical reference composition in the absence of one or two of the polyetherimide, the polyester carbonate, and the reinforcement agent.

12. The composition of claim 1, wherein the composition demonstrates a higher flexural strength compared to a substantially identical reference composition in the absence of one or two of the polyetherimide, the polyester carbonate, and the reinforcement agent.

13. The composition of claim 1, wherein the composition demonstrates a higher melt volume rate compared to a substantially identical reference composition in the absence of the polyester carbonate.

14. The composition of claim 1, wherein the composition demonstrates a higher notched Izod impact strength compared to a substantially identical reference composition in the absence of polyester carbonate.

15. The composition of claim 1, wherein the composition demonstrates a stronger fiber-resin adhesion compared to a substantially identical reference composition in the absence the polyester carbonate.

16. The composition of claim 1, wherein the carbon fiber demonstrates a tensile strength ranging from 2758 MPa to 8274 MPa (400 KSI to 1200 KSI).

17. An article comprising the composition of claim 1.

18. The article of claim 17, wherein the article comprises a metal replacement in a device.

* * * * *